United States Patent
Liu et al.

(10) Patent No.: US 12,232,170 B2
(45) Date of Patent: Feb. 18, 2025

(54) LAA-BASED WIRELESS TRANSMISSION ACCESS METHOD, BASEBAND UNIT, BRIDGING UNIT, REMOTE RADIO UNIT, AND COMPUTER READABLE STORAGE MEDIUM

(71) Applicant: ZTE Corporation, Shenzhen (CN)

(72) Inventors: Zhuyuan Liu, Shenzhen (CN); Diqiang Zhang, Shenzhen (CN); Kai Liu, Shenzhen (CN); Yangfeng Wang, Shenzhen (CN); Yong Pang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 400 days.

(21) Appl. No.: 17/778,225

(22) PCT Filed: Oct. 29, 2020

(86) PCT No.: PCT/CN2020/124991
§ 371 (c)(1),
(2) Date: May 19, 2022

(87) PCT Pub. No.: WO2021/098478
PCT Pub. Date: May 27, 2021

(65) Prior Publication Data
US 2022/0408482 A1 Dec. 22, 2022

(30) Foreign Application Priority Data
Nov. 22, 2019 (CN) .......................... 201911155103.4

(51) Int. Cl.
*H04W 74/0808* (2024.01)
*H04W 74/00* (2009.01)
*H04W 16/14* (2009.01)

(52) U.S. Cl.
CPC ..... *H04W 74/0808* (2013.01); *H04W 74/002* (2013.01); *H04W 16/14* (2013.01)

(58) Field of Classification Search
None
See application file for complete search history.

(56) References Cited

U.S. PATENT DOCUMENTS

2009/0129323 A1  5/2009  Chen et al.
2011/0237268 A1  9/2011  Tsuda
(Continued)

FOREIGN PATENT DOCUMENTS

CN  101155099 A  4/2008
CN  104333873 A  2/2015
(Continued)

OTHER PUBLICATIONS

European Patent Office. Extended European Search Report for EP Application No. 20891377.2, mailed Nov. 30, 2022, pp. 1-12.
(Continued)

*Primary Examiner* — Adnan Baig
(74) *Attorney, Agent, or Firm* — Vivacqua Crane, PLLC

(57) ABSTRACT

An LAA-based wireless transmission access method is disclosed including: acquiring, by a BBU, a signal format corresponding to an LBT startup indication, and delivering a corresponding LBT startup indication message; distributing, by a bridge unit, the startup indication message to an RRU; performing, by the RRU, spectrum scanning according to the signal format to obtain idle/busy state information of an unlicensed spectrum in the signal format, and reporting the same to the BBU via the bridge unit; determining, by the BBU, a preemptable unlicensed spectrum in the signal format according to the idle/busy state information, and delivering an occupancy message; delivering, by the bridge unit, the occupancy message to the RRU; determining, by
(Continued)

the RRU, a signal source of the signal format in the occupancy message; if the signal source is a different manufacturer, switching to an intermediate radio frequency processing channel of a different manufacturer for transmission.

17 Claims, 14 Drawing Sheets

(56) References Cited

U.S. PATENT DOCUMENTS

| | | | | |
|---|---|---|---|---|
| 2011/0268440 | A1* | 11/2011 | Du | H04Q 11/0005 |
| | | | | 398/45 |
| 2012/0218921 | A1* | 8/2012 | Kim | H04W 72/535 |
| | | | | 370/280 |
| 2017/0111931 | A1* | 4/2017 | Damnjanovic | H04W 74/0858 |
| 2017/0373890 | A1* | 12/2017 | Fertonani | H04L 27/2634 |
| 2018/0332617 | A1* | 11/2018 | Zeng | H04W 72/0453 |
| 2020/0235788 | A1* | 7/2020 | Rajagopal | H04B 7/0848 |
| 2021/0352644 | A1 | 11/2021 | Zhou | |

FOREIGN PATENT DOCUMENTS

| | | |
|---|---|---|
| CN | 106304368 A | 1/2017 |
| CN | 106571931 A | 4/2017 |
| CN | 109792662 A | 5/2019 |
| EP | 2717499 A1 | 4/2014 |
| EP | 2887722 A1 | 6/2015 |
| KR | 20080111976 A | 12/2008 |
| WO | 2018059512 A1 | 4/2018 |

OTHER PUBLICATIONS

International Searching Authority. International Search Report and Written Opinion for PCT Application No. PCT/CN2020/124991 and English translation, mailed Jan. 29, 2021, pp. 1-10.

* cited by examiner

LAA-BASED WIRELESS TRANSMISSION ACCESS METHOD, BASEBAND UNIT, BRIDGING UNIT, REMOTE RADIO UNIT, AND COMPUTER READABLE STORAGE MEDIUM

CROSS-REFERENCE TO RELATED APPLICATION

This application is a national stage filing under 35 U.S.C. § 371 of international application number PCT/CN2020/124991, filed Oct. 29, 2020, which claims priority to Chinese patent application No. 201911155103.4 filed on Nov. 22, 2019. The contents of these applications are incorporated herein by reference in their entirety.

TECHNICAL FIELD

Embodiments of the disclosure relate to, but not limited to, the field of wireless communication, and in particular, to a Licensed Assisted Access (LAA)-based wireless transmission access method, a baseband unit (BBU), a bridge unit, a remote radio unit (RRU), and a computer-readable storage medium.

BACKGROUND

With the rapid development of wireless communication and the increasing communication demand of customers, the demand for spectrum resources is increasing. However, spectrum resources, especially licensed spectrum resources, are limited. In order to meet users' increasing demand for speed, traffic and bandwidth and solve the problem of spectrum shortage in the case of limited spectrum resources, unlicensed spectrums come into operators' sights. Communication may be conducted on the unlicensed spectrums by utilizing an LAA technology, and a Listen Before Talk (LBT) technology is an important part of an unlicensed spectrum communication technology.

However, at present, the LBT technology is applied only in signal source access processing from the same manufacturer. For signal input from a different manufacturer, the signal can only be amplified, and access to an unlicensed spectrum cannot be realized. Limited by signal sources (the same manufacturer or different manufacturers), the only thing that can be done is to improve the service transmission from the same manufacturer to enhance instantaneous transmission traffic. Access to an unlicensed spectrum cannot be realized for different-manufacturer signal sources, and thus the application scope of the LBT technology is limited. Therefore, the LBT technology is not compatible with signals from different manufacturers and has poor networking flexibility.

SUMMARY

The following is an overview of the subject matters described in detail herein. The overview is not intended to limit the protection scope of the claims.

According to some embodiments of the disclosure, an LAA-based wireless transmission access method, a BBU, a bridge unit, an RRU, and a computer-readable storage medium are provided.

In a first aspect, according to some embodiments of the disclosure, an LAA-based wireless transmission access method applied to a BBU is provided, including: acquiring a signal format corresponding to an LBT startup indication; delivering an LBT startup indication message, the startup indication message including the signal format corresponding to the LBT startup indication; receiving idle/busy state information of an unlicensed spectrum in response to the startup indication message; and determining a preemptable unlicensed spectrum in the signal format according to the idle/busy state information, and delivering an occupancy message, the occupancy message including information of the preemptable unlicensed spectrum and a signal format corresponding to the preemptable unlicensed spectrum.

In a second aspect, according to some embodiments of the disclosure, an LAA-based wireless transmission access method applied to a bridge unit is further provided, including: receiving and distributing an LBT startup indication message, the startup indication message including a signal format corresponding to an LBT startup indication; receiving and reporting idle/busy state information of an unlicensed spectrum in response to the startup indication message; and receiving and distributing an occupancy message; the occupancy message including information of a preemptable unlicensed spectrum determined according to the idle/busy state information and a signal format corresponding to the preemptable unlicensed spectrum.

In a third aspect, according to some embodiments of the disclosure, an LAA-based wireless transmission access method applied to an RRU is further provided, including: receiving an LBT startup indication message, the startup indication message including a signal format corresponding to an LBT startup indication; performing spectrum scanning according to the signal format in the startup indication message to obtain idle/busy state information of an unlicensed spectrum in the signal format, and reporting the information; receiving an occupancy message, the occupancy message including information of a preemptable unlicensed spectrum determined according to the idle/busy state information and a signal format corresponding to the preemptable unlicensed spectrum; and determining a signal source corresponding to the signal format in the occupancy message; in response to the signal source being a different manufacturer, switching a signal transmission channel corresponding to the signal format to an intermediate radio frequency processing channel of a different manufacturer, and performing transmission through the preemptable unlicensed spectrum.

In the fourth aspect, according to some embodiments of the disclosure, a BBU is further provided, including: a memory, a processor, and a computer program stored in the memory and executable by the processor which, when executed by the processor, causes the processor to carry out the LAA-based wireless transmission access method in the first aspect.

In the fifth aspect, according to some embodiments of the disclosure, a bridge unit is further provided, including: a memory, a processor, and a computer program stored in the memory and executable by the processor which, when executed by the processor, causes the processor to carry out the LAA-based wireless transmission access method in the second aspect.

In the sixth aspect, according to some embodiments of the disclosure, an RRU is further provided, including: a memory, a processor, and a computer program stored in the memory and executable by the processor which, when executed by the processor, causes the processor to carry out the LAA-based wireless transmission access method in the third aspect.

In the seventh aspect, according to some embodiments of the disclosure, further provided is a computer-readable storage medium storing computer-executable instructions which, when executed by a processor, cause the processor to carry out the LAA-based wireless transmission access method in the first aspect, in the second aspect, or in the third aspect.

Other features and advantages of the disclosure will be set forth in part in the description which follows and in part will become apparent from the description or may be learned from practice of the disclosure. The objectives and other advantages of the disclosure may be realized and attained by the structure particularly pointed out in the description, claims and the accompanying drawings.

BRIEF DESCRIPTION OF DRAWINGS

The drawings are provided for a further understanding of the technical schemes of the disclosure, and constitute a part of the description. The drawings and the embodiments of the disclosure are used to illustrate the technical schemes of the disclosure and do not limit the technical schemes of the disclosure.

DETAILED DESCRIPTION

In order to make objectives, technical schemes and advantages of the disclosure clearer, the disclosure is described in further detail below with reference to the drawings and embodiments. It is to be understood that embodiments described herein are intended only to illustrate and not to limit the disclosure.

It is to be noted that the terms such as "first" and "second" used in the description, claims and the above drawings are intended to distinguish similar objects, but are not intended to describe a specific sequence or precedence order.

At present, limited by signal sources (the same manufacturer or different manufacturers), the only thing that can be done is to improve the service transmission from the same manufacturer to enhance instantaneous transmission traffic. Access to an unlicensed spectrum cannot be realized for different-manufacturer signal sources, and thus the application scope of the LBT technology is limited. Therefore, the LBT technology is not compatible with signals from different manufacturers and has poor networking flexibility. In the case of device replacement, if the same signal processing is to be realized, all the devices need to be replaced, leading to high costs.

Based on the above, according to some embodiments of the disclosure, an LAA-based wireless transmission access method, a BBU, a bridge unit, an RRU, and a computer-readable storage medium are proposed. The BBU and the RRU are provided with a different-manufacturer processing unit and a different-manufacturer intermediate radio frequency special processing channel respectively, to realize access of a different-manufacturer signal source to an unlicensed spectrum, thereby improving different-manufacturer service transmission, enhancing instantaneous transmission traffic, and expanding the application scope of the LBT technology. In this way, devices from different manufacturers are compatible. In the case of device replacement, there is no need to remove all original devices from the different manufacturers. Instead, the devices from different manufacturers can achieve a signal processing effect of the same manufacturer after the replacement, reducing the costs of device replacement and improving networking flexibility.

The following is a further illustration of embodiments of the disclosure with reference to the drawings.

Example Embodiment One

Figure 1:
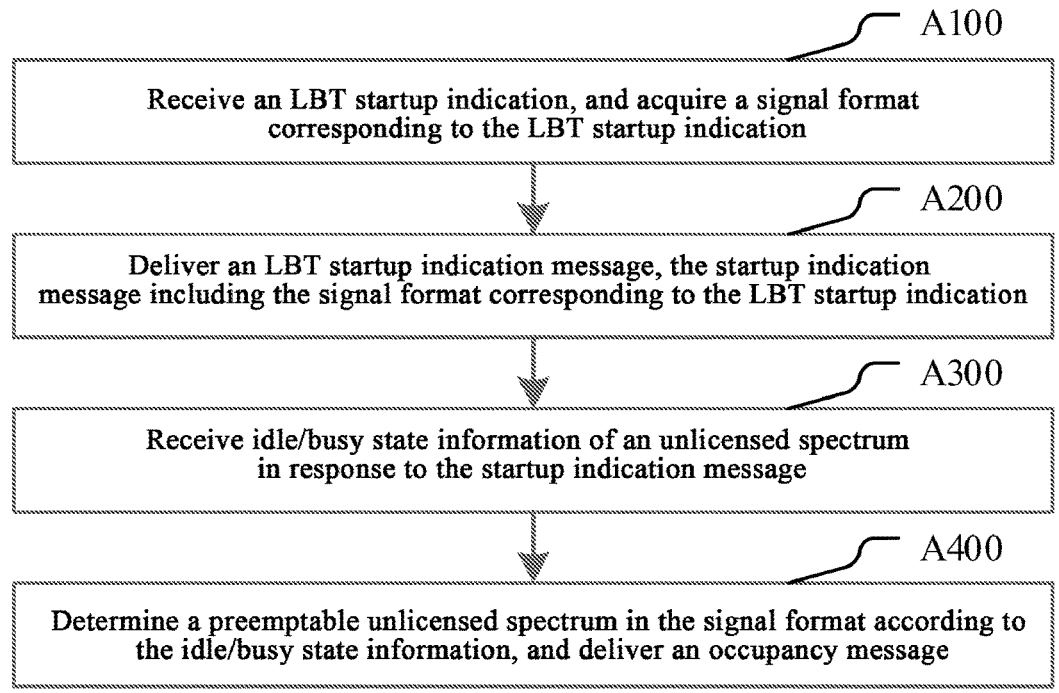
FIG. 1 is a flowchart of an LAA-based wireless transmission access method according to example Embodiment one of the disclosure.

As shown in FIG. 1, FIG. 1 is a flowchart of an LAA-based wireless transmission access method according to this embodiment. The method is applied to a BBU. The method includes steps A100 to A400.

At step A100, an LBT startup indication is received, and a signal format corresponding to the LBT startup indication is acquired.

In the embodiment, the signal format corresponding to the LBT startup indication is a same-manufacturer first signal format, a different-manufacturer second signal format or the first signal format and the second signal format. Since different manufacturers access the BBU through different physical ports, signal formats of different manufacturers may be acquired according to a port configuration table of the BBU.

In the embodiment, in a signal baseband processing process, after a feed-in signal is received, a signal source corresponding to the signal format is judged. In the case of a different-manufacturer signal, the signal is processed by a dedicated different-manufacturer processing unit in the BBU. In the case of a same-manufacturer signal, the signal is directly processed by a same-manufacturer processing unit.

At step A200, an LBT startup indication message is delivered, where the startup indication message includes the signal format corresponding to the LBT startup indication.

In this way, a downlink device may perform spectrum scanning according to the signal format in the startup indication message, so as to obtain idle/busy state information of all unlicensed spectrums in the signal format (the signal format in the startup indication message) in a corresponding cell and then find an occupiable unlicensed spectrum suitable for wireless access of signals corresponding to the signal format.

At step A300, idle/busy state information of an unlicensed spectrum obtained by a downlink device (an RRU) in response to the startup indication message is received. The idle/busy state information is obtained by performing spectrum scanning according to the signal format in the startup indication message by the RRU. Idle/busy state information of each unlicensed spectrum includes occupancy state information (occupied or unoccupied) of each antenna of the unlicensed spectrum on a carrier of the signal format of the unlicensed spectrum. That is, the downlink RRU, after receiving the startup indication message, starts spectrum scanning to scan all unlicensed spectrums in a corresponding cell according to the signal format in the startup indication message to obtain idle/busy state information of the signal format in the startup indication message, and then reports the information.

In the embodiment, in order to reduce the amount of data processing of the BBU and increase a data processing speed of the BBU, the idle/busy state information of the unlicensed spectrums corresponding to the signal format (the same as the signal format in the corresponding startup indication message) received by the BBU may be aggregated idle/busy state information. That is, before reporting the information to the BBU, the bridge unit aggregates all idle/busy state information reported from different RRUs. The aggregating includes, but is not limited to, the following steps.

The bridge unit classifies all the received idle/busy state information according to different signal formats to obtain idle/busy state information of each signal format (including idle/busy state information of different unlicensed spectrums in the signal format).

The idle/busy state information of the signal format is classified according to the unlicensed spectrums, to obtain idle/busy state information of each unlicensed spectrum.

Different idle/busy state information (idle/busy state information reported by different RRUs) of a next unlicensed spectrum in the same signal format is aggregated according to occupancy state information of antennas, to finally obtain a piece of aggregated idle/busy state information corresponding to the unlicensed spectrum in the signal format. If occupancy state information of an antenna at a same position in different idle/busy state information of the unlicensed spectrum indicates that the antenna is unoccupied, occupancy state information of the antenna at a corresponding position in the aggregated idle/busy state information of the unlicensed spectrums indicates unoccupied. Otherwise, the occupancy state information indicates occupied. In this way, a plurality of pieces of idle/busy state information are aggregated into one piece of aggregated idle/busy state information.

At step A400, an unlicensed spectrum in an idle state in the signal format (the signal format corresponding to the LBT startup indication) is determined as a preemptable unlicensed spectrum according to the idle/busy state information, an occupancy message is delivered to preempt the preemptable unlicensed spectrum accessible to a signal corresponding to the signal format, and the signal corresponding to the signal format is transmitted through the preemptable unlicensed spectrum. The occupancy message includes information of the preemptable unlicensed spectrum and a signal format corresponding to the preemptable unlicensed spectrum, for the downlink RRU to determine a signal source and preempt an unlicensed spectrum.

Figure 2:
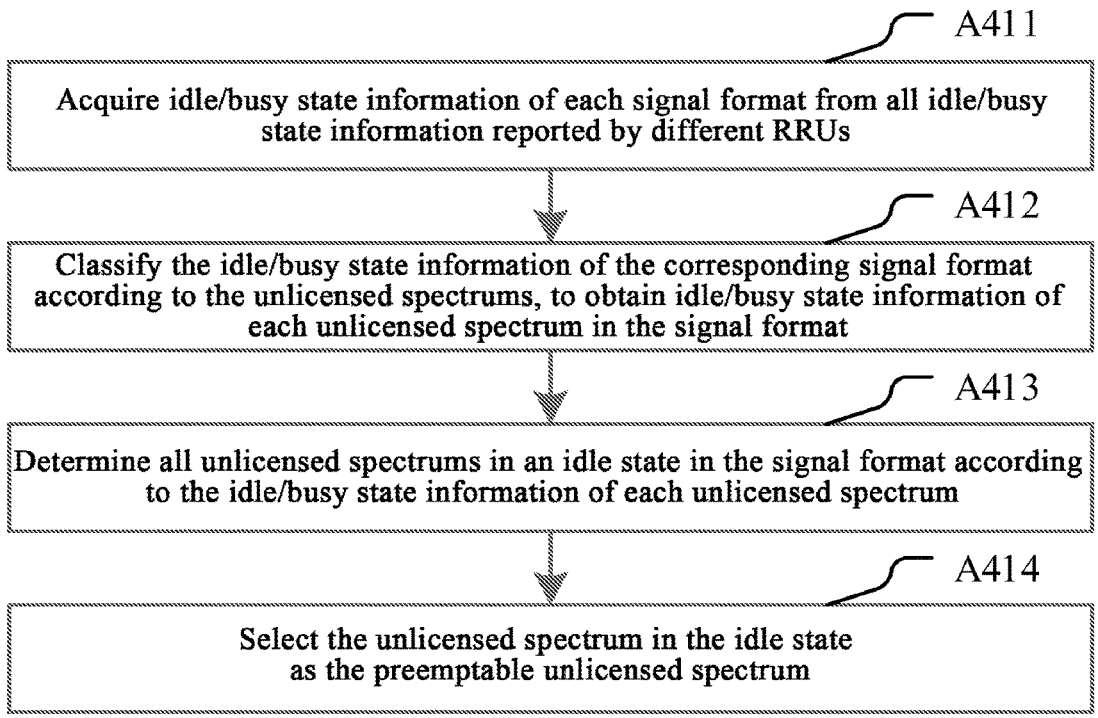
FIG. 2 is a flowchart of determining a preemptable unlicensed spectrum according to idle/busy state information according to example Embodiment one of the disclosure.

In the embodiment, FIG. 2 is a flowchart of determining a preemptable unlicensed spectrum according to idle/busy state information. As shown in FIG. 2, the determining a preemptable unlicensed spectrum according to idle/busy state information includes, but is not limited to, steps A411 to A414.

At step A411, idle/busy state information of each signal format (if not aggregated, the idle/busy state information of each signal format includes different idle/busy state information of different unlicensed spectrums in the signal format reported by each downlink RRU in the cell, and if aggregated, the idle/busy state information of each signal format includes a piece of aggregated idle/busy state information of different unlicensed spectrums) is acquired from all idle/busy state information reported by different RRUs. The idle/busy state information of each unlicensed spectrum reported by each RRU includes: occupancy state information of each antenna on a carrier of the signal format of the unlicensed spectrum. The occupancy state information indicates occupied or unoccupied.

At step A412, the idle/busy state information of the corresponding signal format is classified according to the unlicensed spectrums, to obtain idle/busy state information of each unlicensed spectrum (if not aggregated, the idle/busy state information of each unlicensed spectrum includes different idle/busy state information reported by each downlink RRU in the cell, and if aggregated, the idle/busy state information of each unlicensed spectrum includes a piece of aggregated idle/busy state information) in the signal format.

At step A413, all unlicensed spectrums in an idle state in the signal format are determined according to the idle/busy state information of each unlicensed spectrum. If occupancy state information of each antenna in the idle/busy state information corresponding to the unlicensed spectrum indicates unoccupied, the unlicensed spectrum is determined to be in an idle state. That is, occupancy state information of each antenna on a carrier of the signal format in the idle/busy state information corresponding to the unlicensed spectrum reported by each downlink RRU is unoccupied.

At step A414, the unlicensed spectrum in the idle state is selected as the preemptable unlicensed spectrum. In the embodiment, if one or more unlicensed spectrums in the idle state exist, any one may be selected as the preemptable unlicensed spectrum, or the first unlicensed spectrum in the idle state found may be taken as the preemptable unlicensed spectrum, and then an occupancy message is delivered to perform preemption. If no unlicensed spectrum is in the idle state, a new preemption process starts. That is, step A200 is performed.

In an embodiment, the unlicensed spectrum is a fragment frequency band obtained by fragmenting the unlicensed spectrum. In this case, step A400 is consistent with step A411 to step A414. The unlicensed spectrum is replaced with the fragment frequency band. That is, idle/busy state information of each fragment frequency band is acquired, all fragment frequency bands in the idle state in a corresponding signal format are determined, and finally, the fragment frequency bands in the idle state are selected as preemptable unlicensed spectrums.

In the embodiment, separate or simultaneous wireless access of a same-manufacturer signal source and a different-manufacturer signal source on the unlicensed spectrum may be realized. That is, the signal format (the signal format corresponding to the LBT startup indication) of the feed-in signal includes the following three situations.

(1) The Signal Format Corresponding to the LBT Startup Indication is a Same-Manufacturer First Signal Format.

The idle/busy state information received at step A300 is first idle/busy state information of the unlicensed spectrum in the first signal format. Step A400 includes, but is not limited to, the following operations.

All first idle/busy state information in the first signal format is acquired from all idle/busy state information reported by different RRUs.

The first idle/busy state information is classified according to the unlicensed spectrums, to obtain first idle/busy state information of each unlicensed spectrum in the first signal format.

All unlicensed spectrums in the idle state in the first signal format are determined according to the first idle/busy state information of each unlicensed spectrum in the first signal format.

If there are one or more unlicensed spectrums in the idle state, any one may be selected as a first preemptable unlicensed spectrum in the first signal format, or the first unlicensed spectrum in the idle state found may be taken as a first preemptable unlicensed spectrum, and then an occupancy message is delivered to occupy the first preemptable unlicensed spectrum to transmit a signal corresponding to the first signal format. The occupancy message includes information of the first preemptable unlicensed spectrum and the first signal format. If no unlicensed spectrums are in the idle state, a new preemption process starts. That is, step A200 is performed.

(2) The Signal Format Corresponding to the LBT Startup Indication is a Different-Manufacturer Second Signal Format.

The idle/busy state information received at step A300 is second idle/busy state information of the unlicensed spectrum in the second signal format. Step A400 includes, but is not limited to, the following operations.

All second idle/busy state information in the second signal format is acquired from all idle/busy state information reported by different RRUs.

The second idle/busy state information is classified according to the unlicensed spectrums, to obtain second idle/busy state information of each unlicensed spectrum in the second signal format.

All unlicensed spectrums in the idle state in the second signal format are determined according to the second idle/busy state information of each unlicensed spectrum in the second signal format.

If there are one or more unlicensed spectrums in the idle state, any one may be selected therefrom as a second preemptable unlicensed spectrum in the second signal format, or the second unlicensed spectrum in the idle state found may be taken as a second preemptable unlicensed spectrum, and then an occupancy message is delivered to occupy the second preemptable unlicensed spectrum to transmit a signal corresponding to the second signal format. The occupancy message includes information of the second preemptable unlicensed spectrum and the second signal format. If no unlicensed spectrums are in the idle state, a new preemption process starts. That is, step A200 is performed.

(3) The Signal Format Corresponding to the LBT Startup Indication is a First Signal Format and a Second Signal Format.

The idle/busy state information received at step A300 is the first idle/busy state information of the unlicensed spectrum in the first signal format and the second idle/busy state information in the second signal format. At step A400, an unlicensed spectrum accessible to a same-manufacturer signal and an unlicensed spectrum accessible to a different-manufacturer signal in the idle state are determined respectively. That is, the first idle/busy state information and the second idle/busy state information are searched for unlicensed spectrums in the idle state in the first signal format and the second signal format respectively to serve as the first preemptable unlicensed spectrum and the second preemptable unlicensed spectrum. The process of determining the first preemptable unlicensed spectrum or the second preemptable unlicensed spectrum is the same as the process in which the signal format corresponding to the LBT startup indication is only the first signal format or the second signal format, which is not repeated herein. The two processes may be performed simultaneously or successively.

If an unlicensed spectrum in the idle state exists in the first signal format and/or the second signal format, the unlicensed spectrum in the idle state is selected as the first preemptable unlicensed spectrum and/or the second preemptable unlicensed spectrum, and a corresponding occupancy message is delivered to preempt the first preemptable unlicensed spectrum and/or the second preemptable unlicensed spectrum. The occupancy message includes information of the first preemptable unlicensed spectrum and/or the second preemptable unlicensed spectrum, and the first signal format and/or second signal format.

The first preemptable unlicensed spectrum and/or the second preemptable unlicensed spectrum include/includes the following situations:
  the first preemptable unlicensed spectrum alone;
  the second preemptable unlicensed spectrum alone;
  or
  the first preemptable unlicensed spectrum and the second preemptable unlicensed spectrum.

Correspondingly, for the above three situations with respect to the first preemptable unlicensed spectrum and/or the second preemptable unlicensed spectrum, the delivered occupancy messages are respectively as follows:

the occupancy message includes the first preemptable unlicensed spectrum and the corresponding first signal format;

the occupancy message includes the second preemptable unlicensed spectrum and the corresponding second signal format;

or the occupancy message includes the first preemptable unlicensed spectrum and the corresponding first signal format, as well as the second preemptable unlicensed spectrum and the corresponding second signal format. The information may be delivered through the same occupancy message; or a first occupancy message and a second occupancy message may be delivered for a same manufacturer and different manufacturers, respectively. The first occupancy message includes the first preemptable unlicensed spectrum and the corresponding first signal format, and the second occupancy message includes the second preemptable unlicensed spectrum and the corresponding second signal format.

If no unlicensed spectrum is in the idle state in the first signal format and/or the second signal format, that is, there is no accessible first preemptable unlicensed spectrum and/or second preemptable unlicensed spectrum, a new preemption process starts for the first signal format and/or the second signal format. That is, step A200 is performed. The following situations are included:

in the case of no first preemptable unlicensed spectrum, and a new preemption process starts for the first signal format;

in the case of no second preemptable unlicensed spectrum, and a new preemption process starts for the second signal format; and in the case of no first preemptable unlicensed spectrum and second preemptable unlicensed spectrum, a new preemption process starts for the first signal format and the second signal format. That is, step A200 is performed.

In the embodiment, in order to prevent an unlicensed spectrum occupancy conflict, prior to formal unlicensed spectrum occupancy, a preemptable unlicensed spectrum may be pre-occupied, and the BBU may receive a pre-occupancy conflict message alarming occurrence of a pre-occupancy conflict (the pre-occupancy conflict message includes a corresponding signal format in which a pre-occupancy conflict of a preemptable unlicensed spectrum occurs), indicating that the preemptable unlicensed spectrum has been occupied in the corresponding signal format. After the pre-occupancy conflict message is received, a signal format in the pre-occupancy conflict message is acquired, an LBT startup indication message of the acquired signal format is re-delivered, and a new unlicensed spectrum occupancy process of the corresponding signal format starts. That is, step A200 is performed. It is to be noted that the pre-occupancy conflict message may further include information of the preemptable unlicensed spectrum with a pre-occupancy conflict.

In the embodiment, after the occupancy of the preemptable unlicensed spectrum is ended (signal transmission through the preemptable unlicensed spectrum reaches an occupancy time specified in an LAA protocol or signal transmission is completed prior to the occupancy time specified in the LAA protocol), the occupied preemptable unlicensed spectrum may be released, thereby improving the utilization of the unlicensed spectrum. The BBU receives a release message of the preemptable unlicensed spectrum, the release message including a signal format corresponding to the preemptable unlicensed spectrum at the end of occupancy; acquires the signal format in the release message, delivers an LBT startup indication message of the acquired signal format, and starts a new unlicensed spectrum preemption process for the signal format corresponding to the preemptable unlicensed spectrum at the end of occupancy. That is, step A200 is performed. The release message of the preemptable unlicensed spectrum may further include information of the released preemptable unlicensed spectrum, and the like. In another embodiment, the receiving a release message of the preemptable unlicensed spectrum further includes: judging whether to stop LBT, and if no, delivering an LBT startup indication message corresponding to the signal format, that is, performing step A200; otherwise, stopping an LBT process, and using a licensed spectrum for signal transmission.

In the embodiment, in addition to determining the preemptable unlicensed spectrum in the signal format (the signal format corresponding to the LBT startup indication) according to the idle/busy state information, in order to shorten the time of the RRU's scanning the unlicensed spectrum and improve the probability of the BBU's finding an available unlicensed spectrum, so as to achieve the purpose of increasing a speed of preempting the unlicensed spectrum, the method further includes determining an alternative unlicensed spectrum in the signal format according to the idle/busy state information, and delivering information of the alternative unlicensed spectrum in the signal format to each downlink RRU.

An alternative unlicensed spectrum means that the occupancy state information of respective antennas in all the idle/busy state information corresponding to the alternative unlicensed spectrum indicates there are occupied antennas and the number of occupied antennas is no greater than a preset threshold. Such an unlicensed spectrum has a relatively high probability of being in the idle state (that is, such unlicensed spectrum tends to be in the idle state). In the case of a new round of unlicensed spectrum preemption, the downlink RRU only needs to perform dynamic spectrum scanning (DFS) on a plurality of alternative unlicensed spectrums, which greatly reduces the number of unlicensed spectrums to be scanned, shortens the scanning time of the unlicensed spectrums, and reduces the amount of idle/busy state information retrieved by the BBU, so that available preemptable unlicensed spectrums in the idle state can be rapidly retrieved, thereby increasing the speed of unlicensed spectrum preemption. On the other hand, since the alternative unlicensed spectrums are unlicensed spectrums having a relatively high probability of being in the idle state, the probability that the BBU retrieves a preemptable unlicensed spectrum according to the idle/busy state information of the alternative unlicensed spectrums is increased, which improves a preemption success rate and access efficiency of the unlicensed spectrum in each round.

Figure 3:
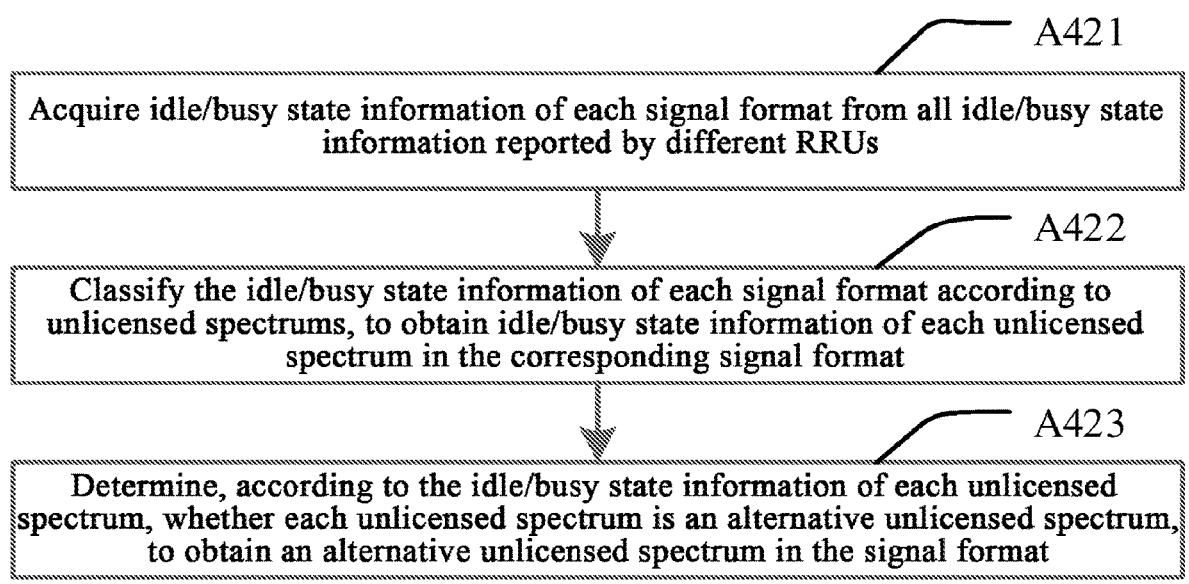
FIG. 3 is a flowchart of determining an alternative unlicensed spectrum according to idle/busy state information according to example Embodiment one of the disclosure.

In the embodiment, FIG. 3 is a flowchart of determining an alternative unlicensed spectrum according to idle/busy state information. As shown in FIG. 3, the determining an alternative unlicensed spectrum according to idle/busy state information includes, but is not limited to, steps A421 to A423.

At step A421, idle/busy state information of each signal format (including idle/busy state information of a plurality of unlicensed spectrums) is acquired from all idle/busy state information reported by different RRUs. That is, all the idle/busy state information reported by different RRUs in a cell is classified according to signal formats. The idle/busy state information includes occupancy state information on a carrier antenna of unlicensed spectrums in the signal format. The occupancy state information indicates occupied or unoccupied.

At step A422, the idle/busy state information of each signal format is classified according to unlicensed spectrums, to obtain idle/busy state information (including the idle/busy state information reported by different RRUs in the cell, that is, a plurality of pieces of idle/busy state information) of each unlicensed spectrum in the corresponding signal format.

At step A423, a determination is made, according to the idle/busy state information of each unlicensed spectrum, as to whether each unlicensed spectrum is an alternative unlicensed spectrum, to obtain an alternative unlicensed spectrum in the signal format. If the occupancy state information of respective antennas in all the idle/busy state information corresponding to the unlicensed spectrum indicates there are occupied antennas and the number of occupied antennas is no greater than a preset threshold, the unlicensed spectrum is determined as an alternative unlicensed spectrum in the corresponding signal format. Finally, the alternative unlicensed spectrums in each signal format are obtained. In the embodiment, the lower the threshold (preset threshold) is, the more likely the unlicensed spectrum that meets the condition is to be in the idle state. It is more likely to find a preemptable unlicensed spectrum by spectrum scanning on such alternative unlicensed spectrums.

In the embodiment, when determining a preemptable unlicensed spectrum and an alternative unlicensed spectrum in the corresponding signal format according to the idle/busy state information, the preemptable unlicensed spectrum and the alternative unlicensed spectrum may be determined respectively according to step A411 to step A414 and step A421 to step A423, including the following situations.
(1) Step A411 to step A414 and step A421 to step A423 are performed simultaneously.
(2) Step A411 to step A414 or step A421 to step A423 are performed first, and then step A421 to step A423 or step A411 to step A414 are performed.

Figure 4:
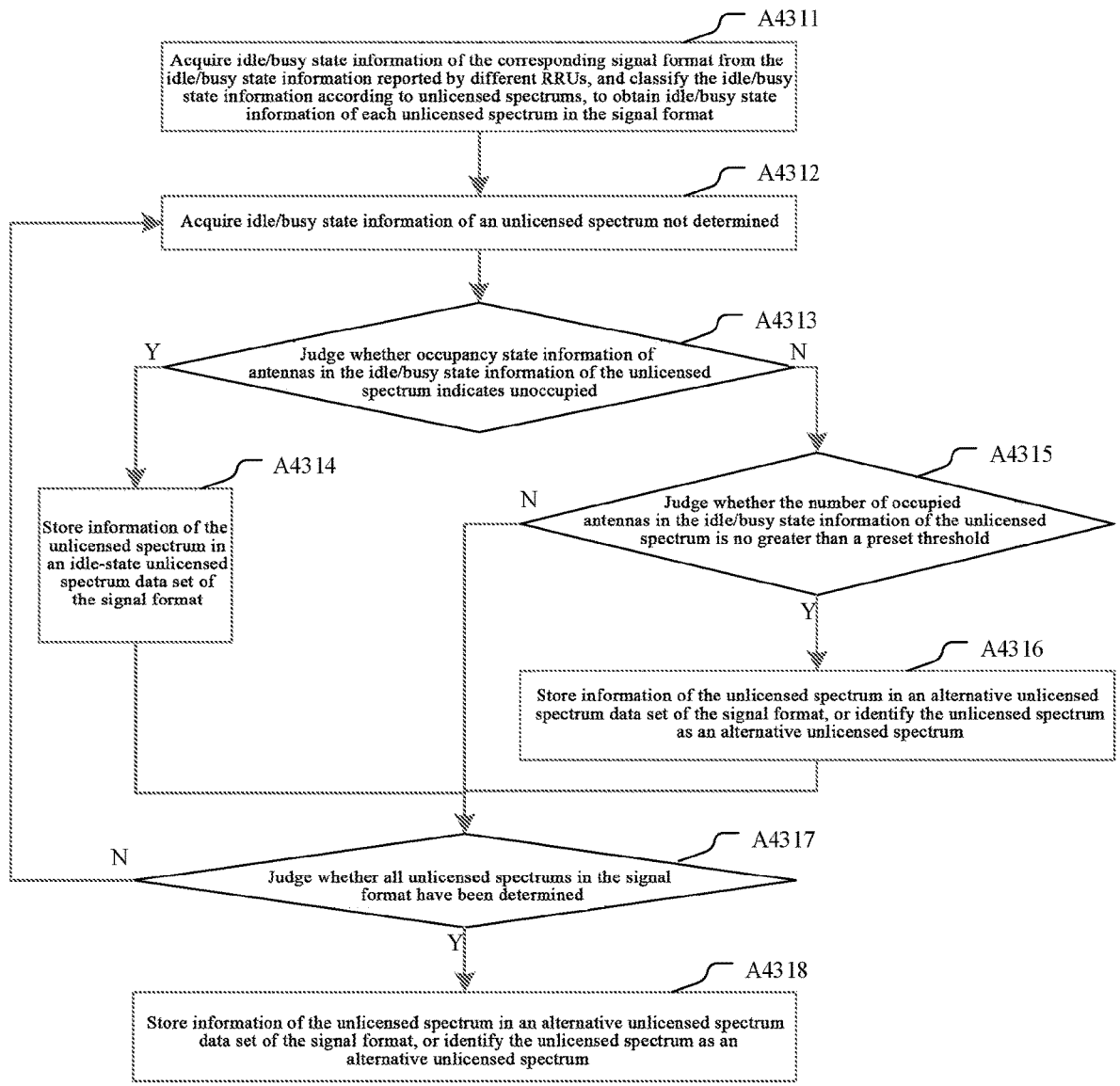
FIG. 4 is a flowchart of determining a preemptable unlicensed spectrum and an alternative unlicensed spectrum corresponding to a signal format according to idle/busy state information according to example Embodiment one of the disclosure.

In the embodiment, when determining the preemptable unlicensed spectrum and the alternative unlicensed spectrum in the corresponding signal format according to the idle/busy state information, the two processes of determining the preemptable unlicensed spectrum and determining the alternative unlicensed spectrum may also be merged. That is, a determination is made, according to judgment conditions of the preemptable unlicensed spectrum and the alternative unlicensed spectrum, as to whether an unlicensed spectrum is in an idle state (or a determination is made as to whether the unlicensed spectrum is in a non-idle state), and then the preemptable unlicensed spectrum and the alternative unlicensed spectrum are determined according to a judgment result. Then, a determination is made as to whether a next unlicensed spectrum is a preemptable unlicensed spectrum or an alternative unlicensed spectrum. By analogy, all unlicensed spectrums in the corresponding signal format are determined to be preemptable unlicensed spectrums or alternative unlicensed spectrums, which, as shown in FIG. 4, includes, but is not limited to, the steps A4311 to A4318.

At step A4311, idle/busy state information of the corresponding signal format is acquired from all the idle/busy state information reported by different RRUs, and the idle/busy state information of the signal format is classified according to unlicensed spectrums, to obtain idle/busy state information of each unlicensed spectrum in the signal format.

At step A4312, idle/busy state information of an unlicensed spectrum not determined is acquired.

At step A4313, a judgement is made as to whether occupancy state information of all antennas in the idle/busy state information of the unlicensed spectrum indicates unoccupied, and if yes, step A4314 is performed; otherwise, step A4315 is performed.

At step A4314, information of the unlicensed spectrum is stored in an idle-state unlicensed spectrum data set of the signal format, or the unlicensed spectrum is identified as an unlicensed spectrum in the idle state or the unlicensed spectrum in the idle state is distinguished in other manners, and then step A4317 is performed.

At step A4315, a judgement is made as to whether the number of occupied antennas in the idle/busy state information of the unlicensed spectrum is no greater than a preset threshold, and if yes, step A4316 is performed; otherwise, step A4317 is performed.

At step A4316, information of the unlicensed spectrum is stored in an alternative unlicensed spectrum data set of the signal format, or the unlicensed spectrum is identified as an alternative unlicensed spectrum or the alternative unlicensed spectrums in the idle state is distinguished in other manners.

At step A4317, a judgement is made on whether all unlicensed spectrums in the signal format have been determined, and if yes, step A4318 is performed; otherwise, step A4312 is performed.

At step A4318, one idle-state unlicensed spectrum is selected from the idle-state unlicensed spectrum data set as a preemptable unlicensed spectrum.

In another embodiment, in order to improve preemption efficiency, an occupancy message is delivered immediately after the first unlicensed spectrum in the idle state is detected. Then, the detected unlicensed spectrum in the idle state is used as an alternative unlicensed spectrum, and after all the unlicensed spectrums in the idle/busy state are traversed, information and a corresponding signal format of the alternative unlicensed spectrum in each signal format are delivered.

Example Embodiment Two

Figure 5:
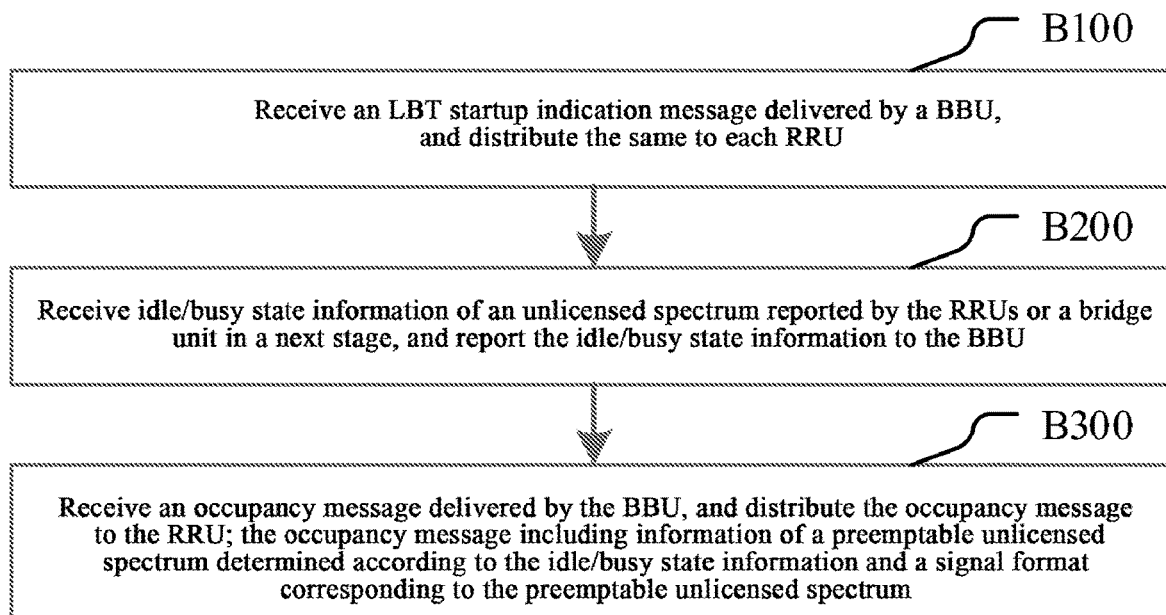
FIG. 5 is a flowchart of an LAA-based wireless transmission access method according to example Embodiment two of the disclosure.

As shown in FIG. 5, FIG. 5 is a flowchart of an LAA-based wireless transmission access method according to the embodiment. The method is applied to a bridge unit. The method includes steps B100 to B300.

At step B100, an LBT startup indication message delivered by a BBU is received and distributed to each RRU stage by stage. The LBT startup indication message includes a signal format corresponding to an LBT startup indication. The signal format corresponding to the LBT startup indication is a same-manufacture first signal format, a different-manufacture second signal format, or the first signal format and the second signal format.

At step B200, idle/busy state information of an unlicensed spectrum reported by the RRU or a bridge unit in a next stage is received and finally reported to the BBU. The idle/busy state information of the unlicensed spectrum is idle/busy state information of an unlicensed spectrum obtained by performing spectrum scanning on unlicensed spectrums in a cell according to the signal format in the startup indication message by each RRU receiving the startup indication message. The bridge unit in each stage reports the idle/busy state information of the unlicensed spectrums reported by the RRUs in the stage to the BBU stage by stage, so that the BBU receives the idle/busy state information of the unlicensed spectrums of each RRU in the system.

At step B300, an occupancy message delivered by the BBU is received and distributed to each RRU, where the occupancy message including information of a preemptable unlicensed spectrum determined according to the idle/busy state information and a signal format corresponding to the preemptable unlicensed spectrum.

Figure 6:
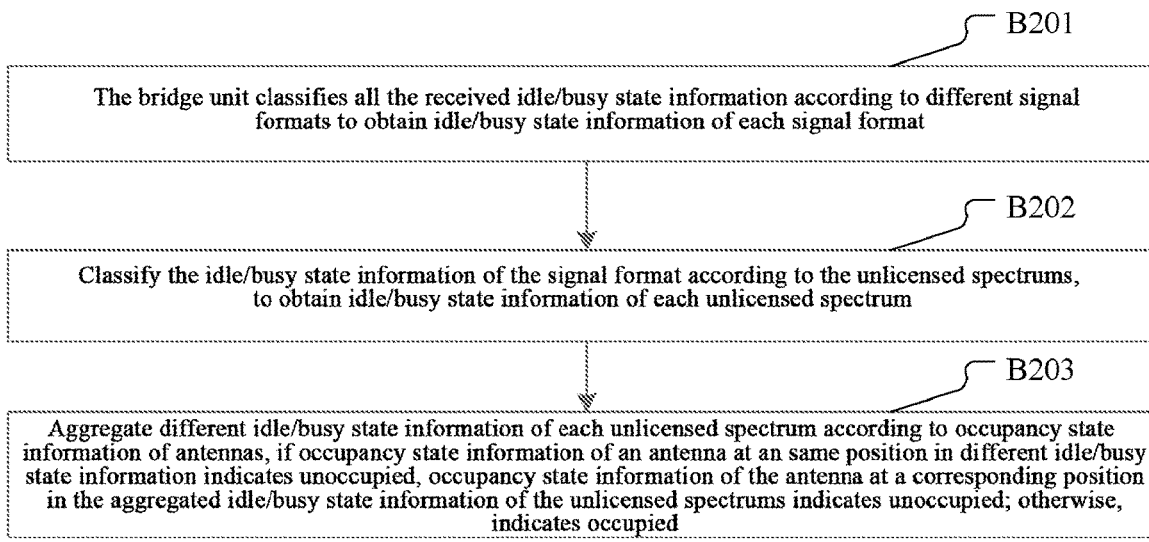
FIG. 6 is a flowchart of aggregating idle/busy state information according to example Embodiment two of the disclosure.

In order to reduce the amount of data processing of the BBU and memory resource usage and increase a data processing speed of the BBU, in the embodiment, the bridge unit in each stage, after receiving the idle/busy state information of the unlicensed spectrum (from the RRUs in the stage or a bridge unit in the next stage), may aggregate the received idle/busy state information of the unlicensed spectrum, and then reports the aggregated idle/busy state information to the BBU. In this case, each unlicensed spectrum has one piece of idle/busy state information in each signal format, and the BBU can judge whether the unlicensed spectrum is in an idle state only according to whether the one piece of idle/busy state information corresponding to the unlicensed spectrum indicates that each antenna is unoccupied. For example, when the signal format is 1 carrier 4 antenna, if the aggregated idle/busy state information of the unlicensed spectrum is 0000, the unlicensed spectrum is in the idle state; and if the aggregated idle/busy state information of the unlicensed spectrum is 0001 or 0100, indicating that an antenna is occupied, and the unlicensed spectrum is in the non-idle state. Therefore, the receiving and reporting idle/busy state information of an unlicensed spectrum in response to the startup indication message includes, but is not limited to, the following steps:

receiving the idle/busy state information of the unlicensed spectrum in response to the startup indication message; and aggregating the received idle/busy state information to obtain aggregated idle/busy state information, reporting the aggregated idle/busy state information to a bridge unit in a previous stage, and reporting the aggregated idle/busy state information to the BBU when the bridge unit in the stage is a first-stage bridge unit. As shown in FIG. 6, the aggregating the idle/busy state information includes steps B201 to B203.

At step B201, the bridge unit classifies all the received idle/busy state information according to different signal formats to obtain idle/busy state information of each signal format (including idle/busy state information of different unlicensed spectrums in the signal format).

At step B202, the idle/busy state information of the signal format is classified according to the unlicensed spectrums, to obtain idle/busy state information of each unlicensed spectrum.

At step B203, different idle/busy state information (idle/busy state information reported by different RRUs) of each unlicensed spectrum in the corresponding signal format is aggregated according to occupancy state information of an antenna, to finally obtain aggregated idle/busy state information corresponding to each unlicensed spectrum in the signal format. If occupancy state information of antennas at a same position in different idle/busy state information of the unlicensed spectrum indicates unoccupied, occupancy state information of the antenna at a corresponding position in the aggregated idle/busy state information of the unlicensed spectrums is unoccupied. Otherwise, the occupancy state information indicates occupied. In this way, a plurality of pieces of idle/busy state information are aggregated into one piece of aggregated idle/busy state information.

In the embodiment, in order to prevent an unlicensed spectrum occupancy conflict, prior to formal unlicensed spectrum occupancy, a preemptable unlicensed spectrum may be pre-occupied. If a pre-occupancy conflict occurs, the bridge unit may report a pre-occupancy conflict message (the pre-occupancy conflict message includes a corresponding signal format in which a pre-occupancy conflict of a preemptable unlicensed spectrum occurs) reported by the RRUs to the BBU stage by stage, and deliver an LBT startup indication message delivered by the BBU in response to the pre-occupancy conflict message to each RRU stage by stage, where the signal format in the startup indication message is the same as the pre-occupancy conflict message in the signal format, to start a new unlicensed spectrum occupancy process of the corresponding signal format. That is, step B100 is performed. It is to be noted that the pre-occupancy conflict message may further include information of the preemptable unlicensed spectrum with a pre-occupancy conflict.

In the embodiment, after the occupancy of the preemptable unlicensed spectrum is ended, the RRUs may release the occupied preemptable unlicensed spectrum, thereby improving the utilization of the unlicensed spectrum. The bridge unit may report a release message of the preemptable unlicensed spectrum reported by the RRUs to the BBU stage by stage. The release message includes a signal format corresponding to the preemptable unlicensed spectrum at the end of occupancy. The bridge unit delivers an LBT startup indication message delivered by the BBU in response to the release message (the signal format in the startup indication message having the same signal format as the release message), and distributes the LBT startup indication message to each RRU stage by stage, to start a new unlicensed spectrum occupancy process of the corresponding signal format. That is, step B100 is performed.

In order to shorten the time of the RRU's scanning the unlicensed spectrum and improve the probability of the BBU's finding an available unlicensed spectrum, so as to achieve the purpose of increasing the speed of preempting the unlicensed spectrum, in the embodiment, the bridge unit further determines alternative unlicensed spectrums in the corresponding signal format according to the idle/busy state information, and delivers information of the alternative unlicensed spectrum in the signal format to each downlink RRU. The detailed step of determining alternative unlicensed spectrums in the corresponding signal format according to the idle/busy state information is the same as the process (step A421 to step A423) of determining an alternative unlicensed spectrum by the BBU in example Embodiment one, which is not repeated herein. As can be seen from step A421 to step A423, when the process of determining an alternative unlicensed spectrum is to be performed, there is a need to obtain idle/busy state information of all unlicensed spectrums in the signal format reported by all the RRUs in the system. Not all the bridge units can perform the process of determining an alternative unlicensed spectrum, and only the first-stage bridge unit meets the above condition.

In practical applications, the process of determining an alternative unlicensed spectrum may be performed in the BBU or in the first-stage bridge unit. Generally, in order to reduce the load of data processing of the BBU and memory resource usage, the process of determining an alternative unlicensed spectrum may be performed in the first bridge unit. For an embodiment in which the process of determining an alternative unlicensed spectrum is performed in the BBU, the bridge unit may distribute information of the alternative unlicensed spectrum delivered by the BBU down to each RRU stage by stage.

Example Embodiment Three

Figure 7:
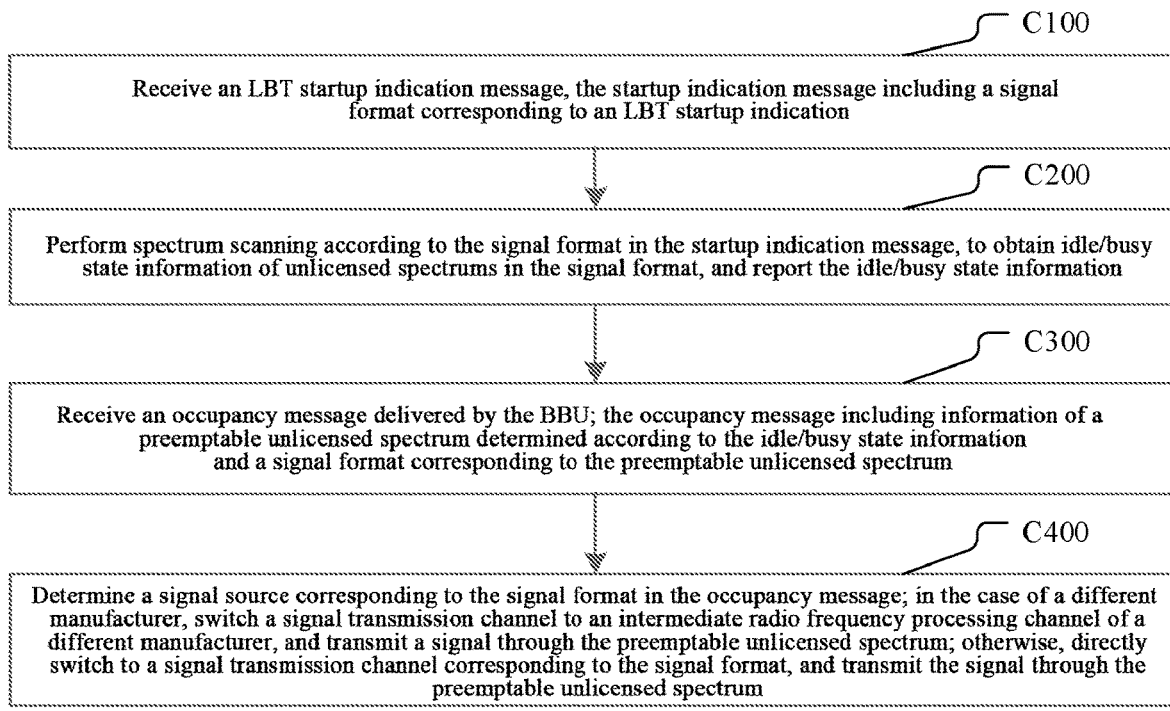
FIG. 7 is a flowchart of an LAA-based wireless transmission access method according to example Embodiment three of the disclosure.

As shown in FIG. 7, FIG. 7 is a flowchart of an LAA-based wireless transmission access method according to this embodiment. The method is applied to an RRU. The method includes steps C100 to C400.

At step C100, an LBT startup indication message is received, where the startup indication message includes a signal format corresponding to an LBT startup indication. The signal format corresponding to the LBT startup indication is a same-manufacture first signal format, a different-manufacture second signal format, or the first signal format and the second signal format.

At step C200, spectrum scanning (for example, DFS) is performed according to the signal format in the startup indication message (the signal format corresponding to the LBT startup indication), to obtain idle/busy state information of unlicensed spectrums (including all unlicensed spectrums covered in a cell corresponding to the RRU) in the signal format and report the idle/busy state information. That is, the idle/busy state information of unlicensed spectrums in the signal format in the startup indication message is reported to be BBU directly or through a bridge unit.

In the embodiment, the performing spectrum scanning on an unlicensed spectrum according to the signal format in the startup indication message (the signal format corresponding to the LBT startup indication), to obtain idle/busy state information of the unlicensed spectrum in the signal format includes, but is not limited to, the following steps.

The signal format in the LBT startup indication message is acquired.

Spectrum scanning is performed on all unlicensed spectrums distributed in a cell according to the acquired signal format to obtain idle/busy state information of each unlicensed spectrum in the signal format. The idle/busy state information includes occupancy state information on a carrier antenna of the unlicensed spectrums in the signal format. The occupancy state information indicates occupied or unoccupied.

In an embodiment, the unlicensed spectrums are fragment frequency bands obtained by fragmenting an unlicensed spectrum, and spectrum scanning is performed on all fragment frequency bands distributed in a cell according to the signal format in the startup indication message to obtain idle/busy state information of the fragment frequency bands in the signal format. The idle/busy state information includes occupancy state information of antennas at a carrier of the signal format of the fragment frequency band. The occupancy state information indicates occupied or unoccupied.

At step C300, an occupancy message delivered by the BBU is received, where the occupancy message includes information of a preemptable unlicensed spectrum determined according to the idle/busy state information and a signal format corresponding to the preemptable unlicensed spectrum.

At step C400, a signal source (the signal source includes a same-manufacturer signal or a different-manufacturer signal, a judgment basis is a port configuration table delivered by the BBU, and since different manufacturers access the BBU through different physical ports, a signal manufacturer connected to each physical port and a corresponding signal format are recorded in the port configuration table) corresponding to the signal format in the occupancy message is determined. If the signal source is a different manufacturer, a signal transmission channel corresponding to the signal format in the occupancy message is switched to an intermediate radio frequency processing channel of a different manufacturer, and a signal (corresponding to the signal format in the occupancy message) is transmitted through the preemptable unlicensed spectrum. If the signal source is a same manufacturer, a signal transmission channel corresponding to the signal format (i.e., the signal format in the occupancy message) is directly switched to, and the signal is transmitted through the preemptable unlicensed spectrum.

Figure 8:
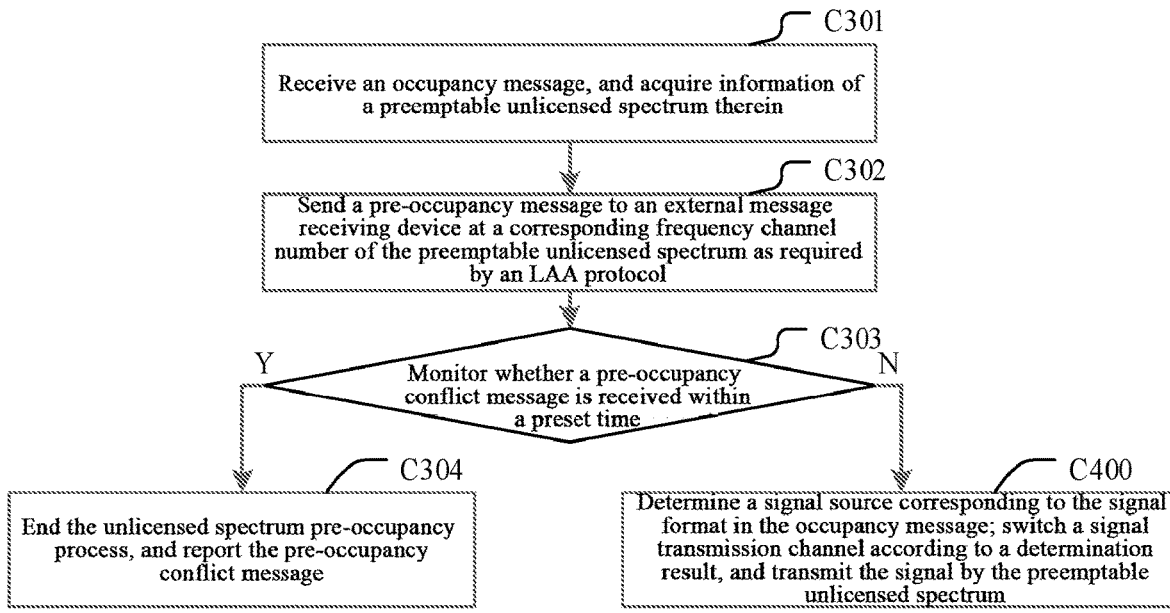
FIG. 8 is flowchart of pre-occupancy of a preemptable unlicensed spectrum according to example Embodiment three of the disclosure.

In order to prevent an unlicensed spectrum occupancy conflict, an unlicensed spectrum pre-occupancy process is further included in the embodiment. As shown in FIG. 8, the unlicensed spectrum pre-occupancy process includes steps C301 to C304.

At step C301, after an occupancy message is received, information of a preemptable unlicensed spectrum in the occupancy message is acquired.

At step C302, a pre-occupancy message is sent to an external message receiving device (including an external base station, a user equipment (UE), WIFI, etc.) at a corresponding frequency channel number of the preemptable unlicensed spectrum as required by an LAA protocol.

At step C303, whether a pre-occupancy conflict message is received within a preset time is monitored. If the pre-occupancy conflict message is received within the preset time, it indicates that the preemptable unlicensed spectrum has been occupied, and step C304 is performed; otherwise, it indicates that the preemptable unlicensed spectrum in the pre-occupancy message is unoccupied and can be occupied, and step C400 is performed.

At step C304, the unlicensed spectrum pre-occupancy process is ended, that is, step C400 is not performed, and the pre-occupancy conflict message is reported, to start a new unlicensed spectrum pre-occupancy process, which effectively prevents an unlicensed spectrum pre-occupancy conflict and improves the reliability of unlicensed spectrum pre-occupancy.

If signal transmission through the preemptable unlicensed spectrum reaches an occupancy time specified in an LAA protocol (i.e., the occupancy time of the unlicensed spectrum is as required by the LAA protocol) or signal transmission is completed prior to the occupancy time specified in the LAA protocol, occupancy of the preemptable spectrum ends. In order to improve the utilization of the unlicensed spectrum, in the embodiment, the occupied preemptable unlicensed spectrum is released to complete corresponding channel switching, signal transmission is performed using a licensed spectrum, and a release message is reported to the BBU to start a new preemption process. The release message includes a signal format corresponding to the preemptable unlicensed spectrum at the end of occupancy.

In order to improve the speed of spectrum scanning and the probability of retrieving the preemptable unlicensed spectrum from the idle/busy state information obtained from spectrum scanning, this embodiment provides a spectrum scanning optimization scheme, including the following steps.

Information of alternative unlicensed spectrums in the corresponding signal format is received and saved. Occupancy state information of respective antennas in all the idle/busy state information corresponding to the alternative unlicensed spectrums indicates there are occupied antennas, and the number of the occupied antennas is no greater than a preset threshold. When a startup indication message of a new round of unlicensed spectrum preemption for the signal format is received, the RRUs receiving and storing the information of the alternative unlicensed spectrums retrieve and find the information of the corresponding alternative unlicensed spectrums according to a signal format in the startup indication message. Spectrum scanning is performed on all alternative unlicensed spectrums corresponding to the signal format according to the signal format in the startup indication message, to obtain idle/busy state information of each alternative unlicensed spectrum in the signal format. The idle/busy state information of all the alternative unlicensed spectrums is reported. The idle/busy state information includes occupancy state information on a carrier antenna of the unlicensed spectrum in the signal format. The occupancy state information indicates occupied or unoccupied.

Figure 9:
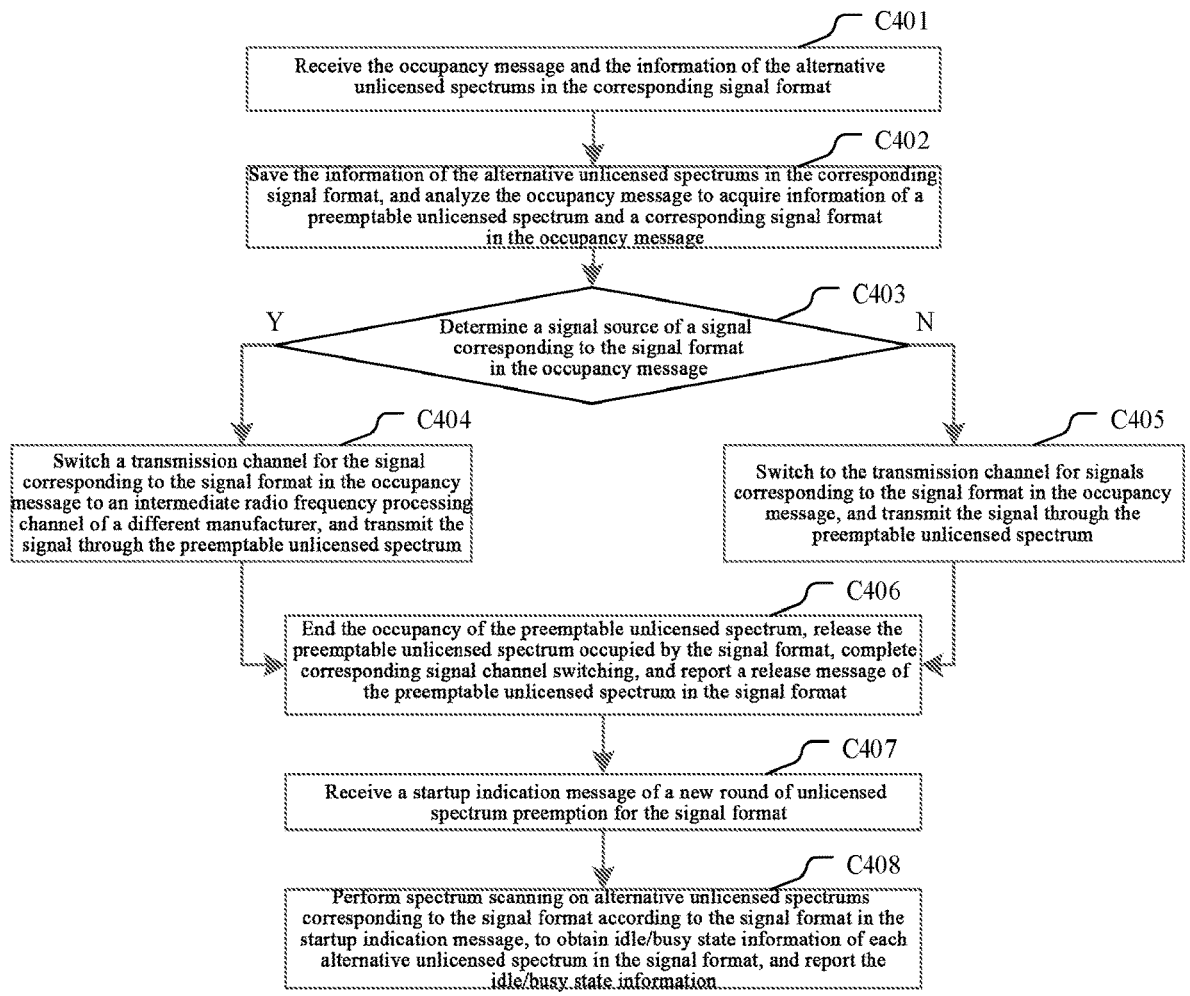
FIG. 9 is a flowchart of step C400 when an occupancy message and information of an alternative unlicensed spectrum of a corresponding signal format are simultaneously received according to example Embodiment three of the disclosure.

In the embodiment, as shown in FIG. 9, a processing process of step C400 of receiving, by the RRU, an occupancy message and information of an alternative unlicensed spectrum in the corresponding signal format simultaneously includes, but is not limited to, the steps C401 to C408.

At step C401, the occupancy message and the information of the alternative unlicensed spectrum in the corresponding signal format are received.

At step C402, the information of the alternative unlicensed spectrum in the corresponding signal format is saved, and the occupancy message is analyzed to acquire information of a preemptable unlicensed spectrum and a corresponding signal format in the occupancy message.

At step C403, a signal source of a signal corresponding to the signal format in the occupancy message is determined; a signal transmission channel is switched according to the signal source, and in the case of a different-manufacturer signal, step C404 is performed; otherwise, step C405 is performed.

At step C404, the signal transmission channel corresponding to the signal format in the occupancy message is switched to an intermediate radio frequency processing channel of a different manufacturer, and the signal is transmitted through the preemptable unlicensed spectrum. Then, step C406 is performed.

At step C405, the signal transmission channel corresponding to the signal format in the occupancy message is directly switched to, and the signal is transmitted through the preemptable unlicensed spectrum. Then, step C406 is performed.

At step C406, the occupancy of the preemptable unlicensed spectrum is ended, the preemptable unlicensed spectrum occupied by the signal format is released, corresponding signal channel switching is completed, and a release message of the preemptable unlicensed spectrum in the signal format is reported.

At step C407, a startup indication message of a new round of unlicensed spectrum preemption for the signal format is received.

At step C408, spectrum scanning is performed on alternative unlicensed spectrums corresponding to the signal format according to the signal format in the startup indication message, to obtain idle/busy state information of each alternative unlicensed spectrum in the signal format, and the idle/busy state information is reported.

In the embodiment, the signal format in the startup indication message is a same-manufacture first signal format, a different-manufacture second signal format, or the first signal format and the second signal format.

When the signal in the received startup indication message is the first signal format and the second signal format, spectrum scanning is performed on unlicensed spectrums according to the first signal format and the second signal format respectively to obtain first idle/busy state information and second idle/busy state information of each unlicensed spectrum in the first signal format and the second signal format, which are reported to the bridge unit.

When the received occupancy message includes a first preemptable unlicensed spectrum in the first signal format and a second preemptable unlicensed spectrum in the second signal format (or a first occupancy message including information of a first preemptable unlicensed spectrum and a second occupancy message including information of a second preemptable unlicensed spectrum may be received respectively), signal sources corresponding to first signal format and the second signal format are determined. In the case of a different-manufacture signal, a signal transmission channel corresponding to the signal format in the occupancy message is switched to an intermediate radio frequency processing channel of a different manufacturer, and a signal is transmitted through the preemptable unlicensed spectrum; and in the case of a same-manufacturer signal, a signal transmission channel corresponding to the signal format in the occupancy message is directly switched to, and the signal is transmitted through the preemptable unlicensed spectrum.

Example Embodiment Four

Figure 10:
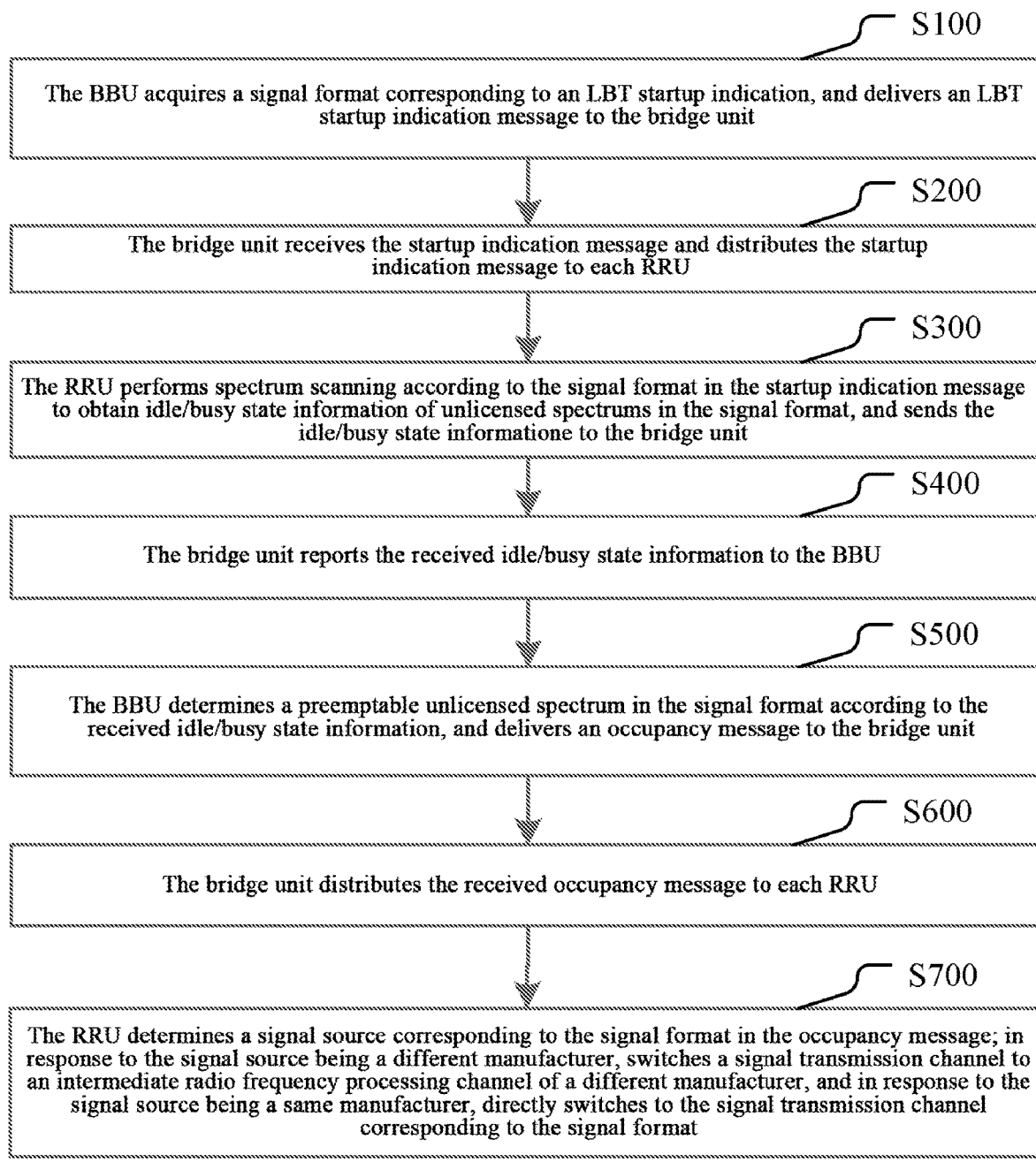
FIG. 10 is a flowchart of an LAA-based wireless transmission access method according to example Embodiment four of the disclosure.

As shown in FIG. 10, FIG. 10 is a flowchart of an LAA-based wireless transmission access method according to the embodiment. The method is applied to a wireless transmission access system including a BBU, bridge units and RRUs, such as a macro station and an indoor distributed system, and supports a micro RRU cascade and a BBU bridge unit cascade. A plurality of micro RRUs and cascaded micro RRUs may be connected to a BBU bridge unit. In the embodiment, the bridge unit may be an RRU (a macro RRU may be regarded as a bridge unit having an intermediate radio frequency function) or a BBU bridge unit. The embodiment provides an LAA-based wireless transmission access method, including, but not limited to, steps S100 to S700.

At step S100, the BBU acquires a signal format corresponding to an LBT startup indication, and delivers an LBT startup indication message to the bridge unit. The startup indication message includes the signal format corresponding to the LBT startup indication.

In the embodiment, the signal format corresponding to the LBT startup indication is a same-manufacturer first signal format, a different-manufacturer second signal format or the first signal format and the second signal format. Since different manufacturers access the BBU through different physical ports, signal formats of different manufacturers may be acquired according to a port configuration table of the BBU.

In the embodiment, for a signal baseband processing process, after a feed-in signal is received, a signal source corresponding to the signal format is judged according to the acquired signal format corresponding to the LBT startup indication. In the case of a different-manufacturer signal, the signal is processed by a dedicated different-manufacturer processing unit in the BBU. In the case of a same-manufacturer signal, the signal is directly processed by the BBU.

At step S200, the bridge unit receives the startup indication message and distributes the same to each RRU. If a plurality of bridge units are cascaded, the startup indication message is distributed to each RRU stage by stage, such as the indoor distributed system. A first-stage BBU bridge unit receives a startup indication message delivered by a BBU and distributes the startup indication message to the RRUs in the stage and a second-stage BBU bridge unit. The second-stage BBU bridge unit distributes the received startup indication message to the RRUs in the stage and a third-stage BBU bridge unit, and so on. In the case of the macro station, a macro-station RRU may be regarded as a BBU bridge unit. A first-stage RRU distributes the received startup indication message to a second-stage RRU, the second-stage RRU distributes the received startup indication message to a third-stage RRU, and so on. It is to be noted that the bridge unit in a final stage does not distribute any startup indication message to a next stage.

At step S300, the RRUs receive the startup indication message, perform spectrum scanning according to the signal format in the startup indication message to obtain idle/busy state information of unlicensed spectrums in the signal format, and sends the idle/busy state information to the bridge unit. If a plurality of stages of bridge units are cascaded, the RRUs send the idle/busy state information to a corresponding bridge unit.

In the embodiment, when the unlicensed spectrums are fragment frequency bands obtained by fragmenting an unlicensed spectrum, spectrum scanning is performed on all fragment frequency bands distributed in a cell according to the signal format in the startup indication message to obtain idle/busy state information of the fragment frequency bands in the signal format.

At step S400, the bridge unit reports the received idle/busy state information to the BBU. If a plurality of bridge units are cascaded, the idle/busy state information is reported stage by stage and is finally reported to the BBU, such as the indoor distributed system. The first-stage BBU bridge unit receives the idle/busy state information reported by the RRUs in the stage and the idle/busy state information reported by the second-stage BBU bridge unit, and reports all the received idle/busy state information to the BBU. The second-stage BBU bridge unit receives the idle/busy state information reported by the RRUs in the stage and the idle/busy state information reported by the third-stage BBU bridge unit, and reports all the received idle/busy state information to the first-stage BBU bridge unit. By analogy, the idle/busy state information reported by the RRUs in each stage is finally reported to the BBU. It is to be noted that the bridge unit in the final stage reports only the idle/busy state information of the RRUs in the stage.

In the embodiment, in order to reduce the amount of data processing of the BBU and memory resource usage and increase a data processing speed of the BBU, the bridge unit in each stage, after receiving the idle/busy state information (from the RRUs in the stage or the bridge unit in a next stage) of the unlicensed spectrums, may further aggregate the received idle/busy state information of the unlicensed spectrums, and then report the aggregated idle/busy state information to the BBU. The aggregation process is the same as the process in example Embodiment two (step B201 to step B203), and is not repeated herein.

At step S500, the BBU determines a preemptable unlicensed spectrum in the signal format according to the received idle/busy state information, and delivers an occupancy message to the bridge unit. The occupancy message includes information of the preemptable unlicensed spectrum and a signal format corresponding to the preemptable unlicensed spectrum. The determining a preemptable unlicensed spectrum in the corresponding signal format according to the idle/busy state information is the same as the related description in example Embodiment one (step A411 to step A414), and is not repeated herein.

At step S600, the bridge unit distributes the received occupancy message to each RRU. The distribution process is the same as step S200.

At step S700, the RRU determines a signal source corresponding to the signal format in the occupancy message received; if the signal source is a different manufacturer, switches a signal transmission channel corresponding to the signal format to an intermediate radio frequency processing channel of a different manufacturer, and performs transmission through the preemptable unlicensed spectrum in the occupancy message; and if the signal source is a same manufacturer, directly switches to a signal transmission channel corresponding to the signal format, and performs signal transmission through the preemptable unlicensed spectrum. The signal source may be a different manufacturer or a same manufacturer, and a judgment basis is a port configuration table delivered by the BBU. Since different manufacturers access the BBU through different physical ports, a signal manufacturer connected to each physical port and a corresponding signal format are recorded in the port configuration table.

Figure 11:
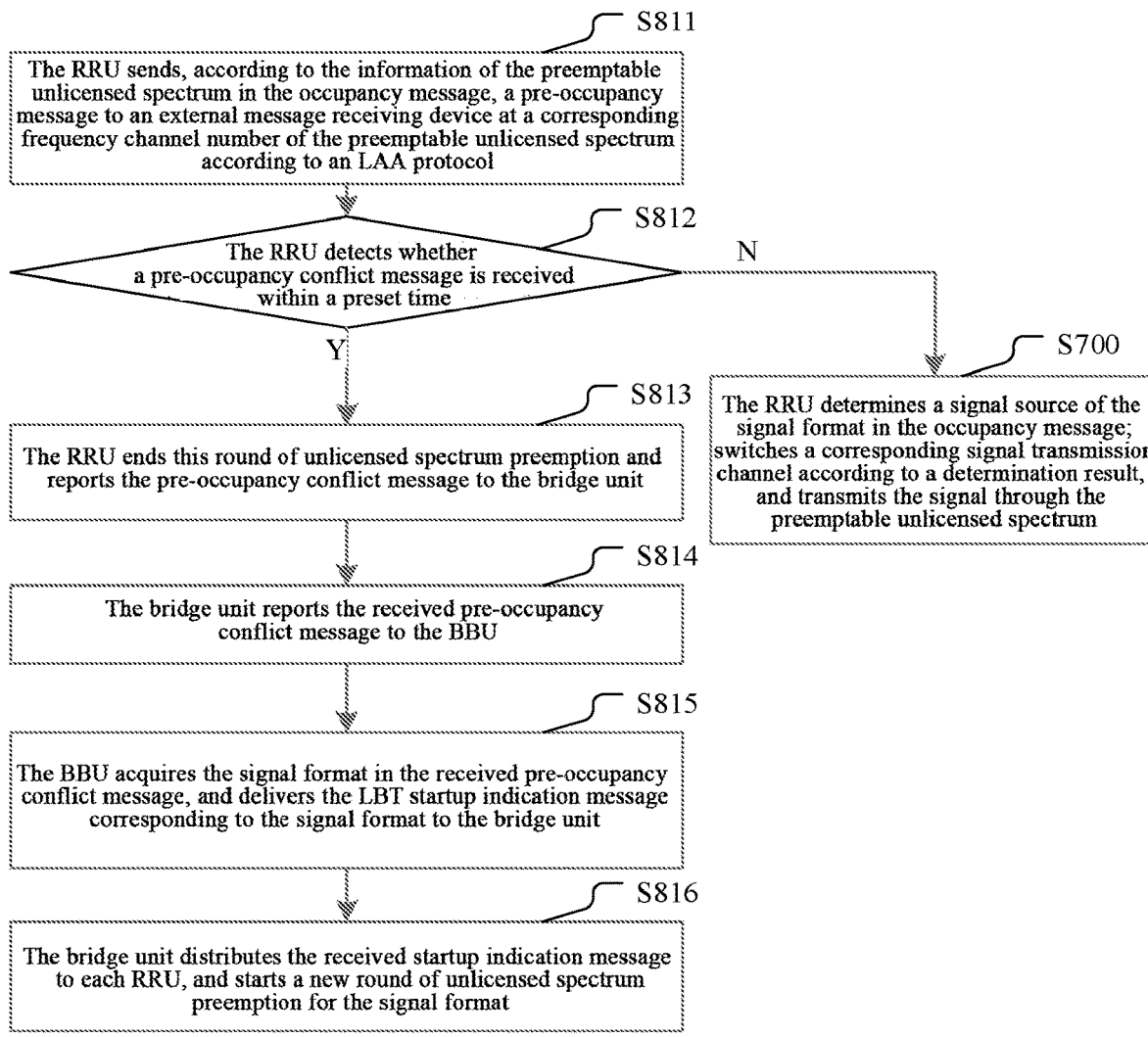
FIG. 11 is flowchart of pre-occupancy of a preemptable unlicensed spectrum according to example Embodiment four of the disclosure.

In order to prevent an occupancy conflict and improve the reliability of unlicensed spectrum occupancy, in the embodiment, prior to the occupancy of the preemptable unlicensed spectrum (step S700), the preemptable unlicensed spectrum is pre-occupied. The process of pre-occupying the preemptable unlicensed spectrum, as shown in FIG. 11, includes, but is not limited to, steps S811 to S816.

At step S811, the RRU sends, according to the information of the preemptable unlicensed spectrum in the occupancy message, a pre-occupancy message to an external message receiving device (including an external base station, a UE, WIFI, etc.) at a corresponding frequency channel number of the preemptable unlicensed spectrum according to an LAA protocol.

At step S812, the RRU detects whether a pre-occupancy conflict message is received within a preset time (if the preemptable unlicensed spectrum is occupied, the pre-occupancy message may not be sent to a corresponding external device, and a prompt message indicative of occurrence of an occupancy conflict may be returned, which is the pre-occupancy conflict message), and if yes, step S813 is performed. Otherwise, it indicates that the preemptable unlicensed spectrum is unoccupied, and step S700 is performed.

At step S813, the RRU terminates this round of unlicensed spectrum preemption and reports the pre-occupancy conflict message to the bridge unit. The pre-occupancy conflict message includes a signal format corresponding to the preemptable unlicensed spectrum with a pre-occupancy conflict.

At step S814, the bridge unit reports the received pre-occupancy conflict message to the BBU. The reporting process is the same as step S400.

At step S815, the BBU acquires the signal format in the received pre-occupancy conflict message, and delivers the LBT startup indication message corresponding to the signal format to the bridge unit.

At step S816, the bridge unit distributes the received startup indication message to each RRU, and starts a new round of unlicensed spectrum preemption for the signal format.

Figure 12:
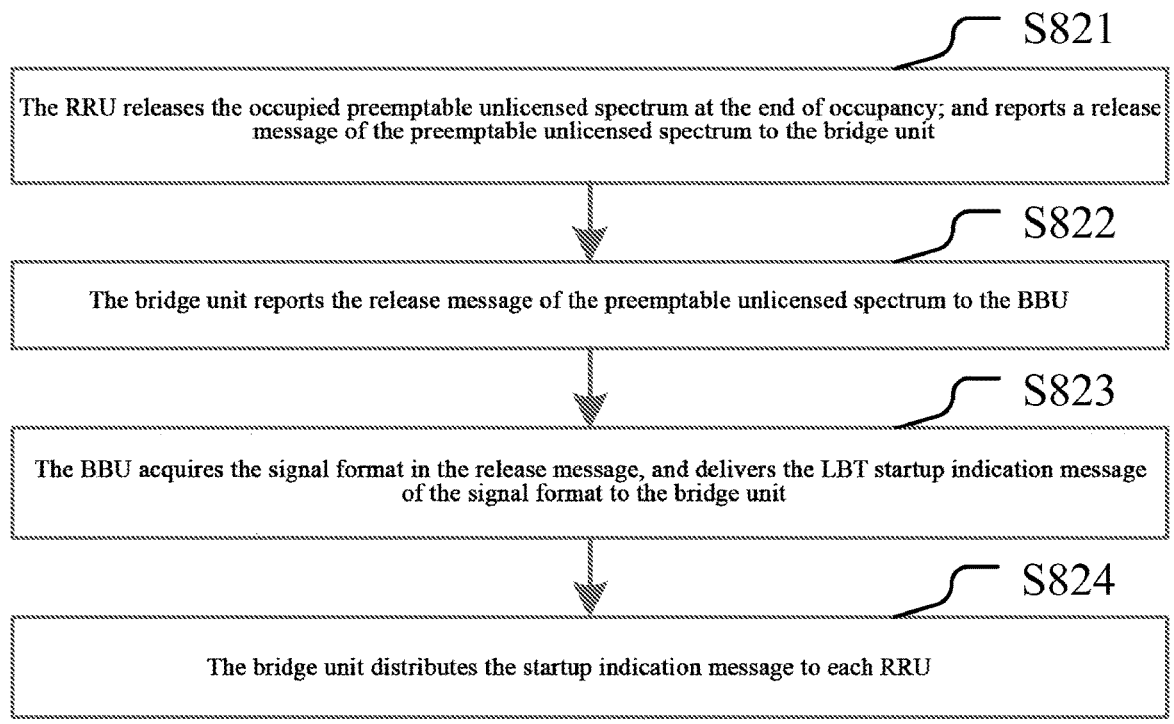
FIG. 12 is flowchart of releasing a preemptable unlicensed spectrum at the end of occupancy according to example Embodiment four of the disclosure.

If signal transmission through the preemptable unlicensed spectrum reaches an occupancy time specified in an LAA protocol (i.e., the occupancy time of the unlicensed spectrum is as required by the LAA protocol) or signal transmission is completed prior to the occupancy time specified in the LAA protocol, the occupancy of the preemptable spectrum ends. In order to improve the utilization of the unlicensed spectrum, in the embodiment, the occupied preemptable unlicensed spectrum is released at the end of occupancy, switching of signal processing channel is performed correspondingly, and a signal in the signal format is transmitted using a licensed spectrum. Then, a new round of unlicensed spectrum preemption is started. As shown in FIG. 12, in the embodiment, the releasing the occupied preemptable unlicensed spectrum at the end of occupancy to start a new round of unlicensed spectrum preemption includes, but is not limited to, steps S821 to S824.

At step S821, the RRU releases the occupied preemptable unlicensed spectrum at the end of occupancy, and reports a release message of the preemptable unlicensed spectrum to the bridge unit, where the release message includes a signal format corresponding to the preemptable unlicensed spectrum at the end of occupancy, and the like.

At step S822, the bridge unit reports the release message of the preemptable unlicensed spectrum to the BBU.

At step S823, the BBU acquires the signal format in the release message, and delivers the LBT startup indication message of the signal format to the bridge unit, to start a new unlicensed spectrum preemption process for the signal format.

At step S824, the bridge unit distributes the startup indication message to each RRU.

In order to improve the efficiency of spectrum scanning and increase the probability of finding an available unlicensed spectrum in each preemption process, the spectrum scanning method is optimized in the embodiment. The unlicensed spectrums having less occupied antennas on a carrier of the signal format are evaluated and selected to obtain alternative unlicensed spectrums more likely to be in an idle state than other unlicensed spectrums. In this way, in a next unlicensed spectrum preemption process of the signal format, unlicensed spectrums in the idle state can be quickly found from the alternative unlicensed spectrums. In the embodiment, the optimizing the spectrum scanning method includes the following situations.

Figure 13:
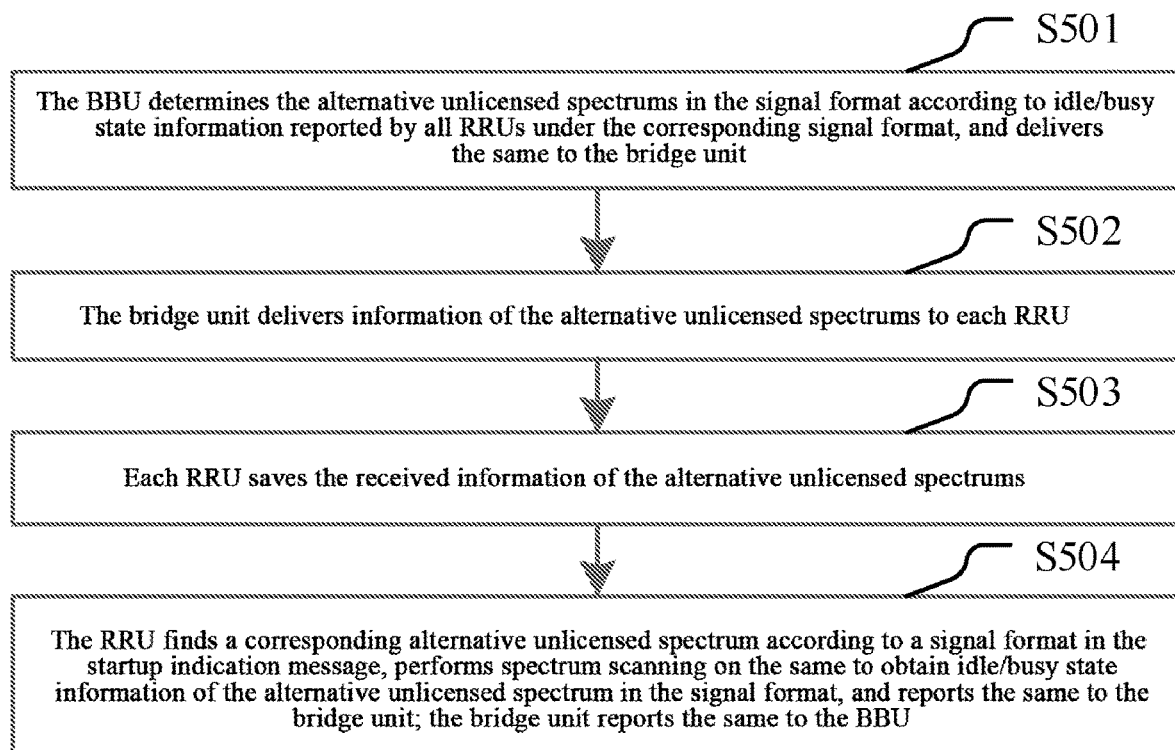
FIG. 13 is a flowchart of optimization of spectrum scanning when a BBU determines an alternative unlicensed spectrum corresponding to a signal format according to example Embodiment four of the disclosure.

(1) The BBU determines alternative unlicensed spectrums corresponding to a signal format. As shown in FIG. 13, a spectrum scanning optimization process in this situation includes, but is not limited to, steps S501 to S504.

At step S501, the BBU determines the alternative unlicensed spectrums in the signal format according to idle/busy state information reported by all RRUs under the corresponding signal format, and delivers the idle/busy state information to the bridge unit.

At step S502, the bridge unit delivers information of the alternative unlicensed spectrums to each RRU stage by stage, so that each RRU in the system can receive the information of the alternative unlicensed spectrums in the signal format.

At step S503, each RRU saves the received information of the alternative unlicensed spectrums.

At step S504, the RRU receives an LBT startup indication message, finds a corresponding alternative unlicensed spectrum according to a signal format in the startup indication message, performs spectrum scanning on the alternative unlicensed spectrums to obtain idle/busy state information of all alternative unlicensed spectrums in the signal format, and reports the idle/busy state information to the bridge unit. The bridge unit reports the idle/busy state information to the BBU stage by stage.

Figure 14:
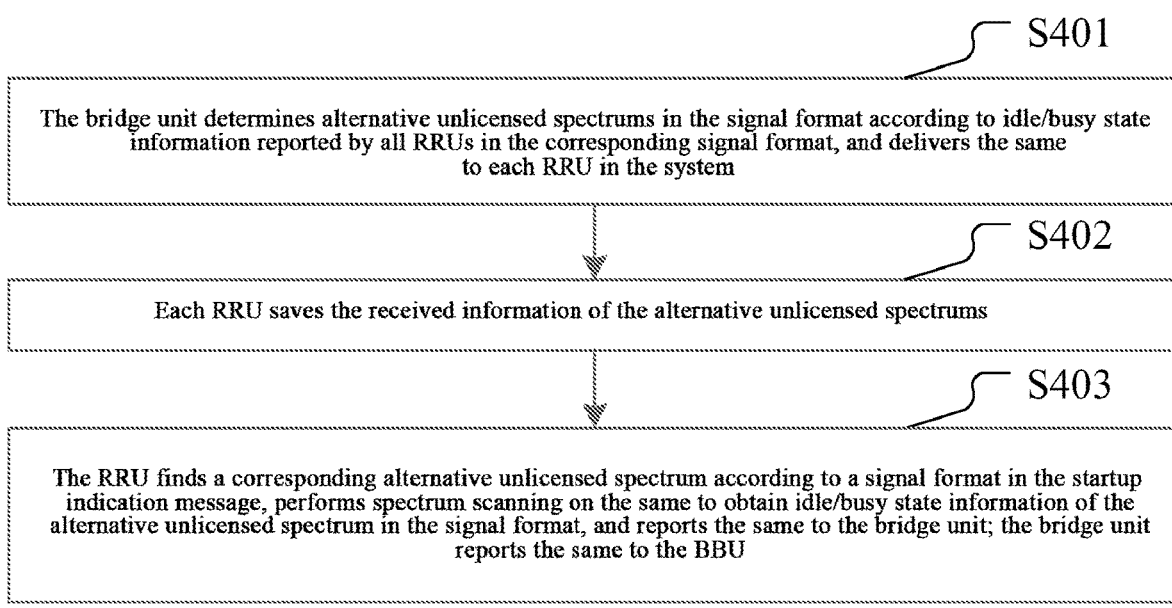
FIG. 14 is a flowchart of optimization of spectrum scanning when a bridge unit determines an alternative unlicensed spectrum corresponding to a signal format according to example Embodiment four of the disclosure.

(2) In order to reduce the amount of data processing of the BBU and memory resource usage, the bridge unit determines alternative unlicensed spectrums corresponding to a signal format. As shown in FIG. 14, a spectrum scanning optimization process in this situation includes, but is not limited to, steps S401 to S403.

At step S401, the bridge unit determines, according to idle/busy state information reported by all RRUs in the corresponding signal format, alternative unlicensed spectrums corresponding to the signal format, and delivers the idle/busy state information to each RRU in the system. It is to be noted that, since the determination of the alternative unlicensed spectrums requires the idle/busy state information of all the alternative unlicensed spectrums in the signal format reported by all the RRUs in the system, not all the bridge units can determine all the alternative unlicensed spectrums, and only the bridge unit meeting a condition "capable of receiving the idle/busy state information reported by all the RRUs" can determine the alternative unlicensed spectrums. For example, in a system where a plurality of bridge units are cascaded, a first-stage bridge unit determines the alternative unlicensed spectrums.

At step S402, each RRU saves the received information of the alternative unlicensed spectrums.

At step S403, the RRU receives an LBT startup indication message, finds corresponding alternative unlicensed spectrums according to a signal format in the startup indication message, performs spectrum scanning on the alternative unlicensed spectrums to obtain idle/busy state information of all alternative unlicensed spectrums in the signal format, and reports the idle/busy state information to the bridge unit. The bridge unit reports the idle/busy state information to the BBU stage by stage.

In the above two situations, an implementation process in which the BBU or the bridge unit determines alternative unlicensed spectrums in a signal format according to idle/busy state information reported by all RRUs in the corresponding signal format is the same as the process (step A421 to step A423) of determining alternative unlicensed spectrums in example Embodiment one, which is not repeated herein.

Figure 15:
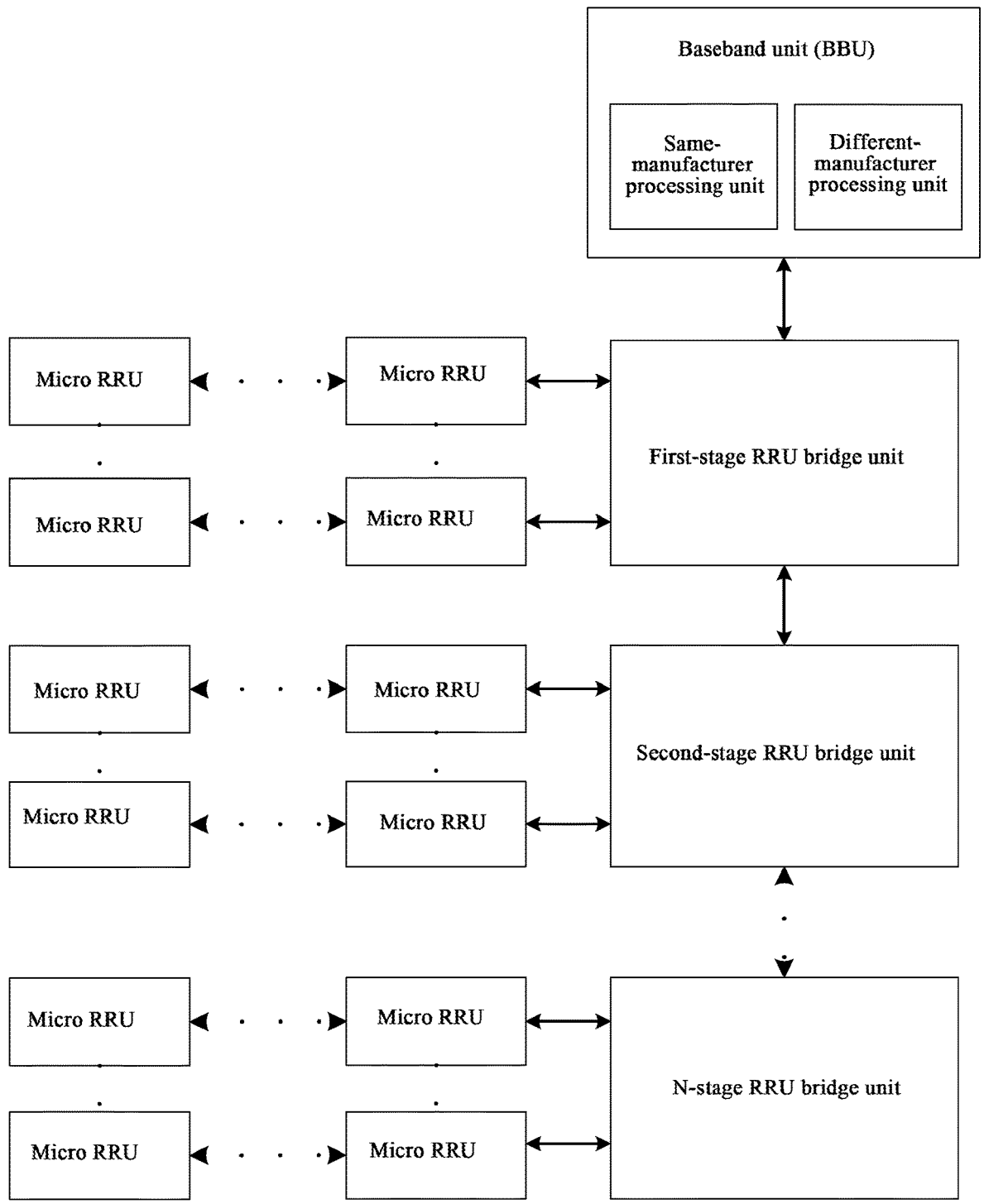
FIG. 15 is a schematic diagram of device networking in an indoor distribution system scenario according to example Embodiment four of the disclosure.
Figure 16:
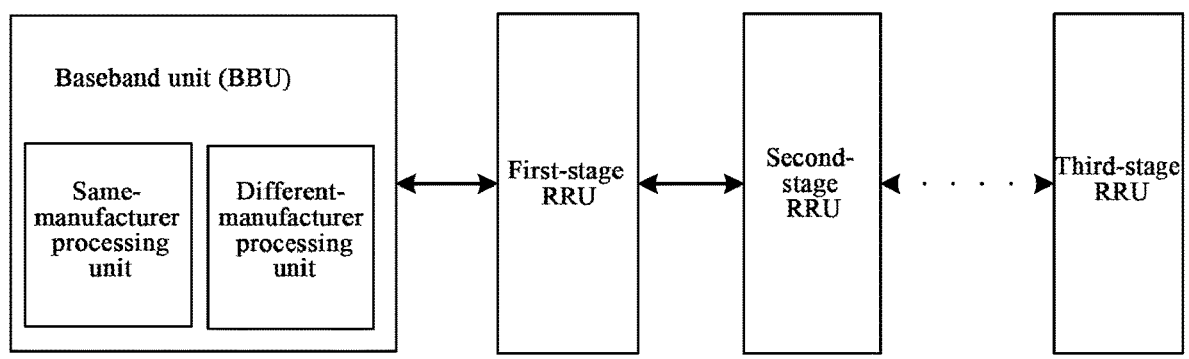
FIG. 16 is a schematic diagram of device networking in a macro station according to example Embodiment four of the disclosure.

In the embodiment, the bridge unit may be a BBU bridge unit or an RRU. In an indoor distributed system scenario, as shown in FIG. 15, the bridge unit is a BBU bridge unit, and a plurality of BBU bridge units may be cascaded. A plurality of micro RRUs and cascaded micro RRUs may be connected to each BBU bridge unit. In a micro station scenario, as shown in FIG. 16, a plurality of macro station RRUs may be cascaded. The macro station RRU may be used as a bridge unit with an intermediate frequency or radio frequency, but no micro RRUs are provided. The BBU and the BBU bridge units, the BBU bridge units, the BBU bridge units and the micro RRUs, and the BBU and the macro station RRUs are connected through optical fibers, network cables and other signal transmission media. The BBU exchanges information with the micro RRUs at each stage through the BBU bridge units to realize a data processing process of one-to-many downlink and many-to-one uplink.

Figure 17:
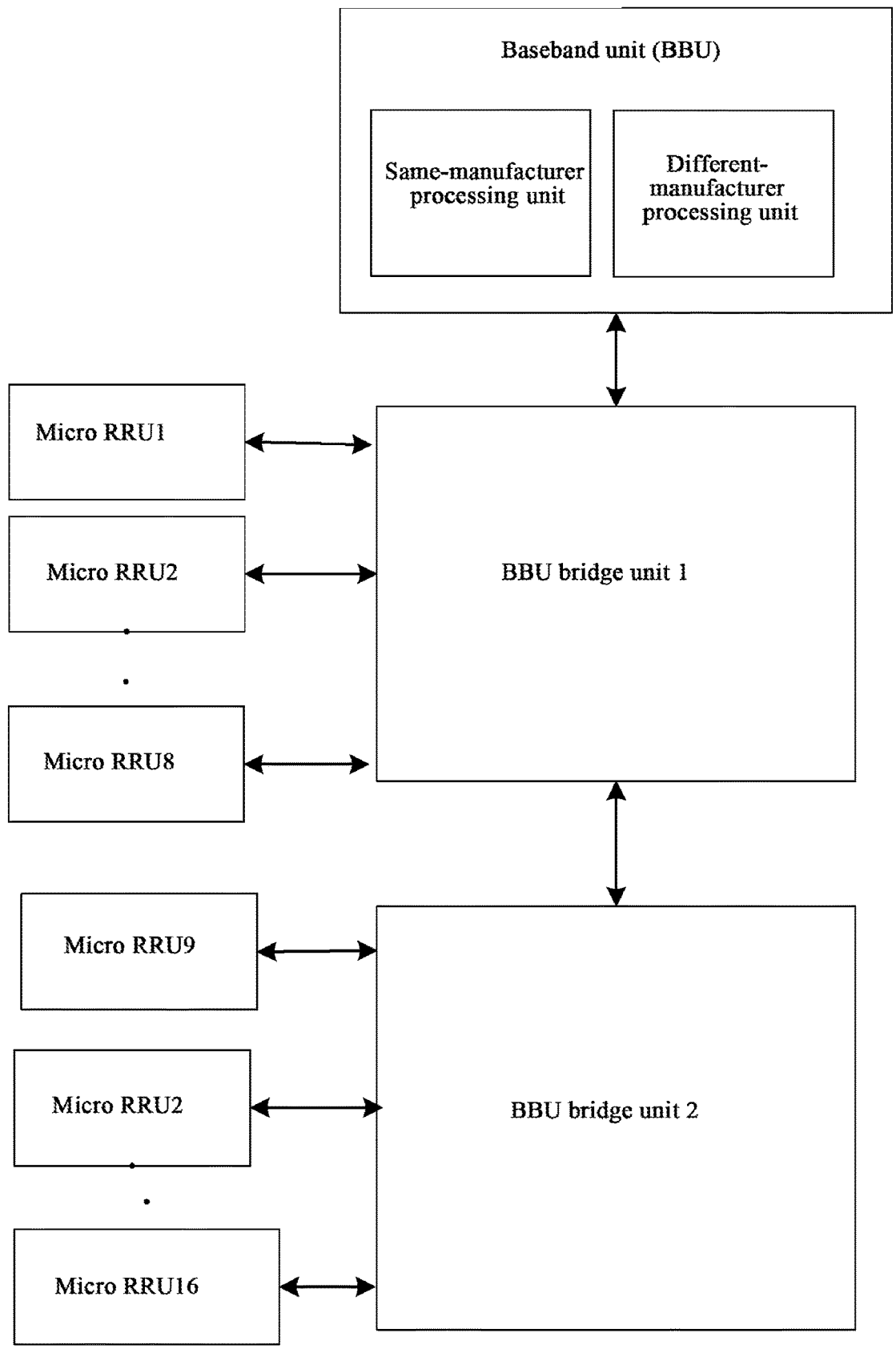
FIG. 17 is a schematic diagram of device networking in an indoor distributed system scenario according to example Embodiment four of the disclosure, where the device networking involves cascading two BBU bridge units with 8 micro RRUs connected to the BBU bridge unit in each stage.

An LAA-based wireless transmission access method is described below with an indoor distributed system scenario. In the indoor distributed system scenario, for distribution of different sources, there is one carrier in a signal format of a different manufacturer A and one carrier in a format of a same manufacturer B. As shown in FIG. 17, the system has two stages of BBU bridge units, 8 micro RRUs are connected to each stage of BBU bridge unit, and there are a total of 16 micro RRUs. 1 carrier in the signal format A corresponds to 1 antenna, and 1 carrier in the signal format B corresponds to 4 antennas.

The LBT processing process in the above embodiment is described below.

1. A background network manager enables LBT functions corresponding to the signal format A and the signal format B at the same time. After receiving an LBT startup indication, the BBU 10 acquires the signal format A and the signal format B, and delivers the startup indication message to a first-stage BBU bridge unit (BBU bridge unit 1).
2. The first-stage BBU bridge unit, after receiving a startup indication message sent from the BBU, sends the startup indication message to 8 micro RRUs (RRU1 to RRU8) in the first stage and a second-stage BBU bridge unit (BBU bridge unit 2), respectively. The BBU bridge unit 2, after receiving the startup indication message, delivers the startup indication message to micro RRUs (RRU9 to RRU16) connected the BBU bridge unit 2.
3. 16 micro RRUs receive the startup indication message forwarded by respective BBU bridge units, and start DFS module to perform DFS on unlicensed spectrums in a cell in the signal formats A and B, to obtain idle/busy state information of the unlicensed spectrums in the signal formats A and B as follows.
   RRU1-RRU2: idle/busy state information of signal format A: 0 0 1 0 1 0 1 0;
   RRU3-RRU4: idle/busy state information of signal format A: 0 1 0 1 0 1 0 1;
   RRU5-RRU6: idle/busy state information of signal format A: 0 0 0 1 0 0 0 0;
   RRU7-RRU8: idle/busy state information of signal format A: 0 1 0 1 0 0 0 0;
   RRU9-RRU10: idle/busy state information of signal format A: 0 0 0 0 0 0 0 1;
   RRU11-RRU12: idle/busy state information of signal format A: 0 0 0 1 0 0 0 1;
   RRU13-RRU14: idle/busy state information of signal format A: 0 0 1 0 0 0 0 1;
   RRU15-RRU16: idle/busy state information of signal format A: 0 1 0 1 0 1 0 1;
   RRU1-RRU2: idle/busy state information of signal format B: 1010 0000 0000 1000 1111 1010 0000 1111;
   RRU3-RRU4: idle/busy state information of signal format B: 0101 0000 0001 0001 0101 0000 0000 0000;
   RRU5-RRU6: idle/busy state information of signal format B: 0111 0000 0000 0000 0000 0100 0101 0101;
   RRU7-RRU8: idle/busy state information of signal format B: 1111 0000 0001 0100 0000 0001 0000 1010;
   RRU9-RRU10: idle/busy state information of signal format B: 0000 0000 0000 0000 0000 1000 1010 0010;
   RRU11-RRU12: idle/busy state information of signal format B: 1111 0000 0100 0010 0010 0000 0000 0101;
   RRU13-RRU14: idle/busy state information of signal format B: 0000 0000 0000 0000 1000 1000 0001 1011;
   RRU15-RRU16: idle/busy state information of signal format B: 1010 0000 0000 0000 0000 0001 1000 1100.

1 bit represents one antenna of one carrier, 1 indicates that the antenna is occupied, and 0 indicates that the antenna is unoccupied. Since 1 carrier in the signal format A corresponds to 1 antenna and 1 carrier in the signal format B corresponds to 4 antennas, the idle/busy state information includes idle/busy state information of 8 fragment frequency bands (fragment frequency band 1 to fragment frequency band 8).

4. Each micro RRU, after completing the spectrum scanning, transmits the idle/busy state information of 1 carrier 1 antenna in the signal format A and 1 carrier 4 antennas in the signal format B back to the BBU bridge unit in the stage. That is, RRU1 to RRU8 send the idle/busy state information to the BBU bridge unit 1, and RRU9 to RRU16 send the idle/busy state information to the BBU bridge unit 2.
5. The BBU bridge unit 2 reports the idle/busy state information to the first-stage bridge unit (BBU bridge unit 1); or the received idle/busy state information may be first aggregated. The idle/busy state information reported by RRU9 to RRU16 may be aggregated to obtain aggregated idle/busy state information of 0 1 1 1 0 1 0 1 of the signal format A and aggregated idle/busy state information of 1111 0000 0100 0010 1010 1001 1011 1111 of the signal format B. Then, the aggregated idle/busy state information in the signal formats A and B is reported to the first-stage bridge unit (BBU bridge unit 1).
6. The BBU bridge unit 1 uploads the idle/busy state information reported by RRU1 to RRU8 and the BBU bridge unit 2 to the BBU; or the idle/busy state information reported by the micro RRU1 to RRU8 and the aggregated idle/busy state information reported by the BBU bridge unit 2 may be aggregated to obtain aggregated idle/busy state information of 0 1 1 1 1 1 1 1 of signal format A and aggregated idle/busy state information of 1111 0000 0101 1111 1111 1111 1111 1111 of the signal format B. Then, the final aggregated idle/busy state information is reported to the BBU.
7. The BBU determines preemptable unlicensed spectrums in the signal format A and the signal format B according to the idle/busy state information reported by RRU1 to RRU16. According to a preemptable unlicensed spectrum determination condition, it may be known that, in the signal format A, in the idle/busy state information reported by micro RRU1 to RRU16, only antenna in the fragment frequency band 1 is unoccupied; and in the signal format B, in the idle/busy state information by micro RRU1 to RRU16, only antennas in the fragment frequency band 2 are unoccupied. Therefore, the preemptable unlicensed spectrums in the signal format A and the signal format B are the fragment frequency band 1 and the fragment frequency band 2, respectively. Certainly, the BBU may also first aggregate the idle/busy state information received from RRU1 to RRU16 to obtain aggregated idle/busy state information of 0 1 1 1 1 1 1 1 of the signal format A and the aggregated idle/busy state information of 1111 0000 0101 1111 1111 1111 1111 1111 of the signal format B. It is confirmed according to the information that for the 1 carrier 1 antenna of the signal format A, the fragment frequency band 1 may be occupied, and for the 1 carrier 4 antennas of the signal system B, the fragment frequency band 2 may be occupied. The BBU delivers an occupancy message to the BBU bridge unit 1 (the first-stage RRU of the macro station in the absence of bridge units) through a physical link to decide to pre-occupy the fragment frequency band, which is uniformly delivered by the BBU here. If the BBU receives the aggregated idle/busy state information, the BBU may judge directly according to the received aggregated idle/busy state information which fragment frequency band in which signal format can be occupy without aggregating the idle/busy state information reported by RRU1 to RRU16, and this part is assigned to each BBU bridge unit. In this way, data process functions of the BBU bridge unit in each stage are fully utilized, the amount of data processing of the BBU is reduced, and the processing speed is increased.

8. The BBU bridge unit 1, after receiving the occupancy message, delivers the occupancy message to the micro RRUs in the current stage (RRU1 to RRU8) and a next-stage BBU bridge unit (BBU bridge unit 2), and the BBU bridge unit 2 delivers the occupancy message to RRU9 to RRU16, respectively.

9. After 16 micro RRUs receive the occupancy message forwarded by the BBU bridge units 1 and 2 through optical fibers respectively, 1 carrier 1 antenna of the signal format A and 1 carrier 4 antennas of the signal format B enable a signal sending control module for the fragment frequency band 1 and the fragment frequency band 2 respectively, and a pre-occupancy message is sent to message receiving devices such as an external base station, a UE and WIFI as required by an LAA protocol. After the pre-occupancy message is sent, if the 16 micro RRU devices do not receive unlicensed frequency band occupancy conflicts within a specified time, spectrum preemption is formally completed, a processing channel is switched according to the signal format (i.e., according to signal format discrimination, for the signal format A, a different-manufacturer dedicated intermediate radio frequency processing channel is switched to, and data transmission is completed through frequency channel number switching and other operations according to an established frame format of the signal format of different manufacturers, and for the signal format B, a signal transmission channel corresponding to the signal format B is directly switched to, to complete data transmission), the occupied fragment frequency bands are used for data transmission. If a conflict occurs, a new round of unlicensed spectrum preemption is started.

10. The 16 micro RRUs perform data transmission on the preemptable spectrums (occupied fragment frequency bands), release the occupied unlicensed spectrums (occupied fragment frequency bands) when the occupancy time of the unlicensed spectrum reaches a time specified the LAA protocol or data transmission is completed within the time specified in the LAA protocol, and switch a corresponding signal processing channel to a licensed spectrum channel. Then, a new unlicensed spectrum preemption process is started.

The spectrum scanning optimization process (determining alternative unlicensed spectrums according to the idle/busy state information) in the above embodiment is described as follows.

1. The BBU or the first-stage BBU bridge unit determines the alternative unlicensed spectrums according to the received idle/busy state information reported by RRU1 to RRU16. If a preset threshold is 3, unlicensed spectrums in the non-idle state with the number of occupied antennas on the carrier of the same signal format being no greater than 3 are alternative unlicensed spectrums. Therefore, the alternative unlicensed spectrums in the signal format A are fragment frequency band 2, fragment frequency band 3, fragment frequency band 5, fragment frequency band 6, and fragment frequency band 7; and the alternative unlicensed spectrums in the signal format B are fragment frequency band 3, fragment frequency band 5, fragment frequency band 6, and fragment frequency band 7. The BBU delivers fragment information of the alternative unlicensed spectrums to the first-stage BBU bridge unit through a physical link.

2. The BBU bridge unit 1 delivers the fragment information of the alternative unlicensed spectrums to 16 micro RRUs through a physical link, and the RRUs store the information of the alternative unlicensed spectrums.

3. After the micro RRUs receive a startup indication message for a new round of unlicensed spectrum preemption, each micro RRU searches for information of the corresponding alternative unlicensed spectrum according to a signal format in the startup indication message, and performs DFS on the alternative unlicensed spectrums if the information of the alternative unlicensed spectrum in the signal format exists, and scans all unlicensed spectrums distributed in a cell if the information of the corresponding alternative unlicensed spectrum does not exist. For example, if the received startup indication message carries the signal format A, the RRU performs DFS on the fragment frequency bands 2, 3, 5, 6, and 7 of the alternative unlicensed spectrums in the signal format A, reports idle/busy state information of the alternative unlicensed spectrum to the BBU bridge unit in the current stage, and reports the idle/busy state information to the BBU stage by stage. The BBU confirms, according to the idle/busy state information of the fragment frequency bands 2, 3, 5, 6, and 7 reported by RRU1 to RRU16, whether unlicensed spectrums in the idle state exist in the alternative unlicensed spectrums, that is, determines preemptable unlicensed spectrums. In this way, available spectrums in the idle state can be quickly retrieved to some extent, which shortens the time of spectrum scanning, thereby improving access efficiency and utilization of the unlicensed spectrums.

In the micro station without BBU bridge units, the RRU in the macro station may be used as a BBU bridge unit with an intermediate radio frequency function. The first-stage RRU may be used as the first-stage BBU bridge unit. The signal processing process of each part is the same as in the indoor distributed system scenario, and is not repeated herein.

Example Embodiment Five

This embodiment further provides a BBU. The BBU, for signal baseband processing, after receiving a feed-in signal, judges a corresponding signal source according to the signal format. In the case of a different-manufacturer signal, the signal is processed by a dedicated different-manufacturer processing unit in the BBU. In the case of a same-manufacturer signal, the signal is directly processed by a same-manufacturer processing unit.

Figure 19:
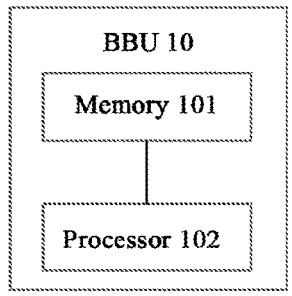
FIG. 19 is a structural block diagram of a BBU according to example Embodiment five of the disclosure.

As shown in FIG. 19, the BBU 10 includes: a memory 101, a processor 102, and a computer program stored in the memory 101 and executable by the processor 102. The computer program, when executed by the processor 102, causes the processor 102 to perform the LAA-based wireless transmission access method as described in example Embodiment one, so as to realize a different-manufacturer LBT process.

Example Embodiment Six

This embodiment further provides a bridge unit. The bridge unit may be a BBU bridge unit or an RRU. In an indoor distributed system scenario, the bridge unit is a BBU bridge unit, and a plurality of micro RRUs and cascaded micro RRUs may be connected to each BBU bridge unit. In a micro station scenario, a plurality of macro station RRUs may be cascaded. The macro station RRU may be used as a bridge unit with intermediate radio frequency. The BBU and the RRU exchange data through the bridge unit. The bridge unit delivers an instruction message of the BBU to each RRU, and reports data information reported by each RRU to the BBU, to realize data management of one-to-many downlink and many-to-one uplink.

Figure 20:
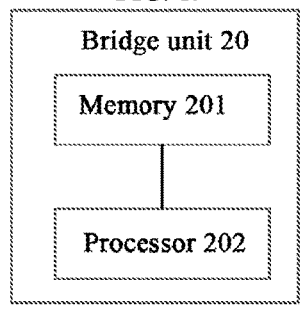
FIG. 20 is a structural block diagram of a bridge unit according to example Embodiment six of the disclosure.

To realize LBT processes of different manufacturers, as shown in FIG. 20, the bridge unit 20 includes: a memory 201, a processor 202, and a computer program stored in the memory 201 and executable by the processor 202. The computer program, when executed by the processor 102, causes the processor 102 to perform the LAA-based wireless transmission access method as described in example Embodiment two.

Example Embodiment Seven

This embodiment further provides an RRU. The RRU may judge a corresponding signal source according to a signal format, so as to select a corresponding signal processing channel, and complete the switching.

Figure 21:
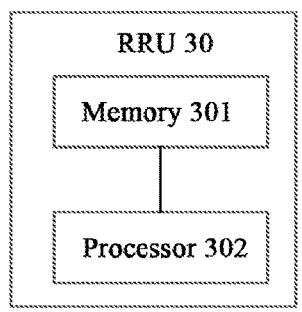
FIG. 21 is a structural block diagram of an RRU according to example Embodiment seven of the disclosure.

To realize LBT processes of different manufacturers, as shown in FIG. 21, the RRU 30 includes: a memory 301, a processor 302, and a computer program stored in the memory 301 and executable by the processor 302. The computer program, when executed by the processor 102, causes the processor 102 to perform the LAA-based wireless transmission access method as described in example Embodiment three.

Example Embodiment Eight

Figure 18:
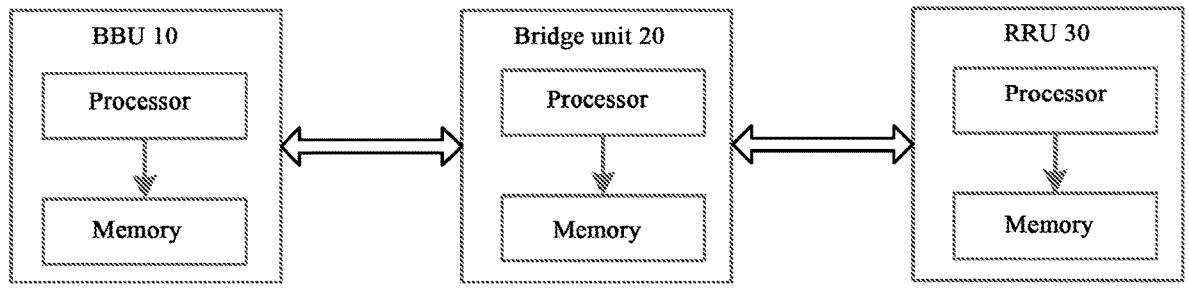
FIG. 18 is a structural block diagram of an LAA-based wireless transmission access system according to example Embodiment eight of the disclosure.

As shown in FIG. 18, this embodiment further provides an LAA-based wireless transmission access system, including a BBU 10, a bridge unit 20, and an RRU 30.

The BBU 10 is configured to acquire a signal format corresponding to an LBT startup indication, and deliver an LBT startup indication message to the bridge unit 20. The startup indication message includes the signal format corresponding to the LBT startup indication.

The bridge unit 20 is configured to receive the startup indication message, and distribute the same to the RRU 30.

The RRU 30 is configured to receive the startup indication message, perform spectrum scanning according to the signal format in the startup indication message to obtain idle/busy state information of unlicensed spectrums in the signal format, and send the idle/busy state information to the bridge unit 20.

The bridge unit 20 receives the idle/busy state information, and reports the idle/busy state information to the BBU 10.

The BBU 10 determines a preemptable unlicensed spectrum in the signal format according to the received idle/busy state information, and delivers an occupancy message to the bridge unit 20. The occupancy message includes information of the preemptable unlicensed spectrum and a signal format corresponding to the preemptable unlicensed spectrum.

The bridge unit 20 receives the occupancy message, and distributes the occupancy message to the RRU 30.

The RRU 30 determines a signal source corresponding to the signal format in the received occupancy message, in the case that the signal source is a different manufacturer, switches a signal transmission channel corresponding to the signal format to an intermediate radio frequency processing channel of a different manufacturer, and performs transmission through the preemptable unlicensed spectrum in the occupancy message.

It is to be noted that more than one bridge unit 20 and more than one RRU 30 are provided. Data signals delivered by the BBU 10 can be distributed to all RRUs 30 in the system through one or more bridge units 20 in the system. Accordingly, the one or more bridge units 20 can also report data signals of all the RRUs 30 in the system to the BBU 10, to realize data management of one-to-many downlink and many-to-one uplink.

In addition, an embodiment of the disclosure further provides a computer-readable storage medium storing computer-executable instructions which, when executed by a processor or controller, cause the processor or controller to perform the LAA-based wireless transmission access method (applied to a BBU) according to example Embodiment one, to perform the LAA-based wireless transmission access method (applied to a bridge unit) according to example Embodiment two, to perform the LAA-based wireless transmission access method (applied to an RRU) according to example Embodiment three, or to perform the LAA-based wireless transmission access method (applied to an LAA-based wireless transmission access system) according to example Embodiment four.

According to the embodiments of the disclosure, a signal format is introduced in processes such as delivery of the LBT startup indication, unlicensed spectrum scanning, and determination of accessible unlicensed spectrums, a signal source is determined according to the signal format, and then a signal processing channel for signals from a different manufacturer is switched to an intermediate radio frequency processing channel of a different manufacturer, so that the LBT technology is not limited to the signal source, and access of a different-manufacturer signal source to an unlicensed spectrum is realized, thereby improving different-manufacturer service transmission, enhancing instantaneous transmission traffic, and expanding the application scope of the LBT technology. In this way, devices from different manufacturers can be compatible. In the case of device replacement, there is no need to remove all original devices from the different manufacturers. Instead, the devices from different manufacturers can achieve a signal processing effect of the same manufacturer after the replacement, reducing the costs of device replacement and improving networking flexibility.

Those having ordinary skill in the art may understand that all or some of the steps in the method and the system disclosed above may be implemented as software, firmware, hardware and appropriate combinations thereof. Some or all of the physical components may be implemented as software executed by a processor such as a central processing unit, a digital signal processor or a microprocessor, or may be implemented as hardware, or may be implemented as an integrated circuit such as an application-specific integrated circuit. Such software may be distributed on a computer-readable medium, which may include a computer storage medium (or non-transitory medium) and a communication medium (or a transitory medium). As is well known to those having ordinary skill in the art, the term "computer storage medium" includes volatile and nonvolatile, removable and non-removable media implemented in any method or technology for storing information (such as computer-readable instructions, data structures, program modules, or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disk (DVD) or other optical storage, magnetic cassette, magnetic tape, magnetic disk storage or other magnetic storage apparatuses, or any other media that can be configured for storing desired information and can be accessed by a computer. Besides, as is well known to those having ordinary skill in the art, the communication medium typically includes computer-readable instructions, data structures, program modules or other data in a modulated data signal such as a carrier wave or other transport mechanisms, and may include any information delivery medium.

The above is a detailed description of the preferred implementations of the disclosure, but the present application is not limited to the above implementations. Those having ordinary skill in the art may also make various equivalent transformations or replacements without departing from the scope of the disclosure, which are included in the protection scope defined by the claims of the disclosure.

The invention claimed is:

1. A Licensed Assisted Access (LAA)-based wireless transmission access method, applied to a baseband unit (BBU), comprising: acquiring a signal format corresponding to a Listen Before Talk (LBT) startup indication, the signal format comprising: a first signal format corresponding to a same manufacturer which is identical to a manufacturer for the BBU; a second signal format corresponding to a different manufacturer which is different from the manufacturer of the BBU; or a first signal format corresponding to a same manufacturer and a second signal format corresponding to a different manufacturer, delivering an LBT startup indication message, the startup indication message comprising the signal format corresponding to the LBT startup indication, receiving idle/busy state information of an unlicensed spectrum in response to the startup indication message; determining a preemptable unlicensed spectrum corresponding to the signal format according to the idle/busy state information, and delivering an occupancy message, the occupancy message comprising information of the preemptable unlicensed spectrum and a signal format corresponding to the preemptable unlicensed spectrum, receiving a release message of the preemptable unlicensed spectrum, the release message comprising the signal format corresponding to the preemptable unlicensed spectrum at the end of occupancy; and acquiring the signal format in the release message, and delivering the LBT startup indication message of the acquired signal format.

2. The method of claim 1, comprising:
acquiring idle/busy state information of the unlicensed spectrum corresponding to the signal format, wherein the idle/busy state information comprises occupancy state information on a carrier antenna of the unlicensed spectrum corresponding to the signal format, and the occupancy state information indicates occupied or unoccupied;
classifying the idle/busy state information of the unlicensed spectrum corresponding to the signal format according to the unlicensed spectrums, to obtain idle/busy state information of each unlicensed spectrum; and
determining the alternative unlicensed spectrum of the signal format according to the idle/busy state information of each unlicensed spectrum, wherein an unlicensed spectrum is determined as the alternative unlicensed spectrum in response to the occupancy state information of antennas in the idle/busy state information of the unlicensed spectrum indicates presence of occupied antennas and the number of the occupied antennas being no greater than a preset threshold.

3. The method of claim 1, wherein the idle/busy state information received is aggregated idle/busy state information obtained by aggregation;
the idle/busy state information comprises occupancy state information on a carrier antenna of the unlicensed spectrum corresponding to the signal format; the occupancy state information indicates occupied or unoccupied; and
the aggregation comprises:
obtaining aggregated idle/busy state information of the unlicensed spectrums corresponding to the signal format according to the occupancy state information of the idle/busy state information of the unlicensed spectrums corresponding to the signal format, wherein in case that all occupancy state information of an antenna at a position in the idle/busy state information of the unlicensed spectrum indicates unoccupied, the occupancy state information of the antenna at the position in the aggregated idle/busy state information of the unlicensed spectrums indicates unoccupied; otherwise, the occupancy state information indicates occupied.

4. The method of claim 1, wherein the determining a preemptable unlicensed spectrum corresponding to the signal format according to the idle/busy state information comprises:
acquiring idle/busy state information of the unlicensed spectrum corresponding to the signal format, wherein the idle/busy state information comprises occupancy state information on a carrier antenna of the unlicensed spectrum corresponding to the signal format, and the occupancy state information indicates occupied or unoccupied;
classifying the idle/busy state information of the unlicensed spectrum corresponding to the signal format according to the unlicensed spectrums, to obtain idle/busy state information of each unlicensed spectrum;
determining all unlicensed spectrums in an idle state corresponding to the signal format according to the idle/busy state information of each unlicensed spectrum, wherein an unlicensed spectrum with occupancy state information of each antenna indicating unoccupied is determined to be in an idle state; and
selecting the unlicensed spectrum in the idle state as the preemptable unlicensed spectrum.

5. The method of claim 1, further comprising:
receiving a pre-occupancy conflict message, the pre-occupancy conflict message comprising a signal format corresponding to the preemptable unlicensed spectrum with a pre-occupancy conflict; and
acquiring the signal format in the pre-occupancy conflict message, and delivering the acquired LBT startup indication message of the signal format.

6. A Licensed Assisted Access (LAA)-based wireless transmission access method, applied to a bridge unit, comprising:
receiving and distributing a Listen Before Talk (LBT) startup indication message, the startup indication message comprising a signal format corresponding to an LBT startup indication, the signal format comprising: a first signal format corresponding to a same manufacturer which is identical to a manufacturer for the BBU; a second signal format corresponding to a different manufacturer which is different from the manufacturer for the BBU; or a first signal format corresponding to a same manufacturer and a second signal format corresponding to a different manufacturer;

receiving and reporting idle/busy state information of an unlicensed spectrum in response to the startup indication message;

receiving and distributing an occupancy message, the occupancy message comprising information of a preemptable unlicensed spectrum determined according to the idle/busy state information and a signal format corresponding to the preemptable unlicensed spectrum;

receiving and reporting a release message, the release message comprising the signal format corresponding to the preemptable unlicensed spectrum at the end of occupancy; and receiving and distributing the LBT startup indication message, the startup indication message having the same signal format as the release message.

7. The method of claim 6, further comprising:

acquiring idle/busy state information of the unlicensed spectrum corresponding to the signal format, wherein the idle/busy state information comprises occupancy state information on a carrier antenna of the unlicensed spectrum corresponding to the signal format, and the occupancy state information indicates occupied or unoccupied;

classifying the idle/busy state information of the unlicensed spectrum corresponding to the signal format according to the unlicensed spectrums, to obtain idle/busy state information of each unlicensed spectrum; and determining the alternative unlicensed spectrum of the signal format according to the idle/busy state information of each unlicensed spectrum, wherein an unlicensed spectrum is determined as the alternative unlicensed spectrum in response to the occupancy state information of antennas in the idle/busy state information of the unlicensed spectrum indicates presence of occupied antennas and the number of the occupied antennas being no greater than a preset threshold.

8. The method of claim 6, further comprising: aggregating the received idle/busy state information to obtain aggregated idle/busy state information;

wherein the idle/busy state information comprises occupancy state information on a carrier antenna of the unlicensed spectrum corresponding to the signal format, the occupancy state information indicating occupied or unoccupied; and the aggregating comprises:

obtaining aggregated idle/busy state information of the unlicensed spectrums corresponding to the signal format according to the occupancy state information of the idle/busy state information of the unlicensed spectrums corresponding to the signal format, wherein in case that all occupancy state information of an antenna at a position in the idle/busy state information of the unlicensed spectrums indicates unoccupied, the occupancy state information of the antenna at the position in the aggregated idle/busy state information of the unlicensed spectrums indicates unoccupied; otherwise, the occupancy state information indicates occupied.

9. The method of claim 6, further comprising:

receiving and distributing information of the alternative unlicensed spectrum in the corresponding signal format;

wherein occupancy state information of respective antennas in all the idle/busy state information corresponding to the alternative unlicensed spectrum indicates presence of occupied antennas and the number of the occupied antennas is no greater than a preset threshold, and the idle/busy state information comprises occupancy state information on a carrier antenna of the unlicensed spectrum corresponding to the signal format, and the occupancy state information indicates occupied or unoccupied.

10. The method of claim 6, further comprising:

receiving and reporting a pre-occupancy conflict message, the pre-occupancy conflict message comprising a signal format corresponding to the preemptable unlicensed spectrum with a pre-occupancy conflict; and receiving and distributing the LBT startup indication message, the startup indication message having the same signal format as the pre-occupancy conflict message.

11. A Licensed Assisted Access (LAA)-based wireless transmission access method, applied to a remote radio unit (RRU), comprising:

receiving a Listen Before Talk (LBT) startup indication message, the startup indication message comprising a signal format corresponding to an LBT startup indication, the signal format comprising: a first signal format corresponding to a same manufacturer which is identical to a manufacturer for the BBU; a second signal format corresponding to a different manufacturer which is different from the manufacturer for the BBU; or a first signal format corresponding to a same manufacturer and a second signal format corresponding to a different manufacturer;

performing spectrum scanning according to the signal format in the startup indication message to obtain idle/busy state information of an unlicensed spectrum corresponding to the signal format, and reporting the idle/busy state information;

receiving an occupancy message, the occupancy message comprising information of a preemptable unlicensed spectrum determined according to the idle/busy state information and a signal format corresponding to the preemptable unlicensed spectrum;

determining a signal source corresponding to the signal format in the occupancy message; in response to the signal source being a different manufacturer, switching a signal transmission channel corresponding to the signal format to an intermediate radio frequency processing channel of a different manufacturer, and performing transmission through the preemptable unlicensed spectrum;

ending the occupancy of the preemptable unlicensed spectrum, and releasing the occupied preemptable unlicensed spectrum; and reporting a release message of the preemptable unlicensed spectrum, the release message comprising the signal format corresponding to the preemptable unlicensed spectrum.

12. The method of claim 11, further comprising:

acquiring information of the preemptable unlicensed spectrum in the occupancy message;

sending a pre-occupancy message to an external message receiving device at a corresponding frequency channel number of the preemptable unlicensed spectrum according to an LAA protocol; and in response to receiving a pre-occupancy conflict message of the pre-occupancy message within a preset time, ending this round of unlicensed spectrum preemption and reporting the pre-occupancy conflict message; the pre-occupancy conflict message comprising a signal format corresponding to the preemptable unlicensed spectrum with a pre-occupancy conflict.

13. The method of claim 11, further comprising:

receiving and storing information of an alternative unlicensed spectrum corresponding to the signal format;

receiving the LBT startup indication message; performing spectrum scanning on the alternative unlicensed spectrum corresponding to the signal format according to the signal format in the startup indication message, to obtain idle/busy state information of the alternative unlicensed spectrum corresponding to the signal format; and reporting the idle/busy state information;

wherein the idle/busy state information comprises occupancy state information on a carrier antenna of the unlicensed spectrum corresponding to the signal format, and the occupancy state information indicates occupied or unoccupied; and occupancy state information of respective antennas in all the idle/busy state information corresponding to the alternative unlicensed spectrum indicates presence of occupied antennas, and the number of the occupied antennas is no greater than a preset threshold.

14. A baseband unit (BBU), comprising: a memory, a processor, and a computer program stored in the memory and executable by the processor which, when executed by the processor, causes the processor to carry out the method of claim 1.

15. A bridge unit, comprising: a memory, a processor, and a computer program stored in the memory and executable by the processor which, when executed by the processor, causes the processor to carry out the method of claim 6.

16. A remote radio unit (RRU), comprising: a memory, a processor, and a computer program stored in the memory and executable by the processor which, when executed by the processor, causes the processor to carry out the method of claim 11.

17. A non-transitory computer-readable storage medium, storing computer-executable instructions which, when executed by a processor, cause the processor to carry out the method of claim 1.

* * * * *